(12) United States Patent
Park et al.

(10) Patent No.: US 10,634,955 B2
(45) Date of Patent: Apr. 28, 2020

(54) DISPLAY PANEL AND METHOD OF FABRICATING THE SAME

(71) Applicant: Samsung Display Co., Ltd., Yongin-Si, Gyeonggi-Do (KR)

(72) Inventors: Saeron Park, Gimhae-si (KR); Seungki Song, Yongin-Si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/236,648

(22) Filed: Dec. 31, 2018

(65) Prior Publication Data

US 2019/0204638 A1    Jul. 4, 2019

(30) Foreign Application Priority Data

Jan. 2, 2018 (KR) ........................ 10-2018-0000385

(51) Int. Cl.
| | | |
|---|---|---|
| *H01L 51/52* | (2006.01) | |
| *G02F 1/1339* | (2006.01) | |
| *G02F 1/1345* | (2006.01) | |
| *G02F 1/1333* | (2006.01) | |
| *G02F 1/1362* | (2006.01) | |

(Continued)

(52) U.S. Cl.
CPC .......... *G02F 1/1339* (2013.01); *G02F 1/1333* (2013.01); *G02F 1/1345* (2013.01); *G02F 1/1362* (2013.01); *G02F 1/13452* (2013.01); *G02F 1/13458* (2013.01); *G02F 1/133351* (2013.01); *G02F 1/136286* (2013.01); *G02F 1/1368* (2013.01); *G02F 1/134363* (2013.01);

(Continued)

(58) Field of Classification Search
CPC .................................................... G02F 1/1345
See application file for complete search history.

(56) References Cited

U.S. PATENT DOCUMENTS

| | | | |
|---|---|---|---|
| 7,315,342 B2 | 1/2008 | Kuo et al. | |
| 2012/0104420 A1* | 5/2012 | Lee .................... | H01L 27/3276 257/88 |

(Continued)

FOREIGN PATENT DOCUMENTS

| | | |
|---|---|---|
| EP | 2806307 A1 | 11/2014 |
| EP | 3112931 A1 | 1/2017 |

(Continued)

OTHER PUBLICATIONS

European Communication corresponding to European Patent Application No. 18215627.3 dated Jul. 16, 2019 14 pages.

(Continued)

*Primary Examiner* — Thao P Le
(74) *Attorney, Agent, or Firm* — Innovation Counsel LLP

(57) ABSTRACT

A display panel includes a first display substrate, a second display substrate facing and spaced apart from the first display substrate, a non-conductive sealing member disposed between the first display substrate and the second display substrate and formed around an outer perimeter of the display panel, a conductive sealing member disposed inside the non-conductive sealing member when viewed in a plan view, and a connection pad coupled to a side surface of the first display substrate and a side surface of the non-conductive sealing member. A signal line includes an end portion overlapping with the non-conductive sealing member and connected to the connection pad.

21 Claims, 30 Drawing Sheets

(51) Int. Cl.
*G02F 1/1343* (2006.01)
*G02F 1/1368* (2006.01)

(52) U.S. Cl.
CPC .. *G02F 1/136213* (2013.01); *G02F 1/136227* (2013.01); *G02F 2001/136222* (2013.01)

(56) References Cited

U.S. PATENT DOCUMENTS

| | | | | |
|---|---|---|---|---|
| 2012/0153814 | A1* | 6/2012 | Lee | H01L 51/524 |
| | | | | 313/504 |
| 2014/0063432 | A1 | 3/2014 | Yamazaki et al. | |
| 2014/0333609 | A1* | 11/2014 | Takahara | H01L 27/1255 |
| | | | | 345/214 |
| 2016/0079333 | A1* | 3/2016 | Shishido | H01L 27/3262 |
| | | | | 257/72 |
| 2016/0377905 | A1 | 12/2016 | Choi et al. | |
| 2017/0017101 | A1 | 1/2017 | Morita et al. | |
| 2017/0082900 | A1 | 3/2017 | Kong et al. | |
| 2019/0348491 | A1* | 11/2019 | Chung | G09G 3/3233 |

FOREIGN PATENT DOCUMENTS

| | | |
|---|---|---|
| KR | 10-2014-0049405 A | 4/2014 |
| KR | 10-2015-0072743 A | 6/2015 |
| KR | 10-2017-0002283 A | 1/2017 |
| KR | 10-2019-0035993 A | 4/2019 |

OTHER PUBLICATIONS

Partial European Search Report, Application No. 18215627.3, dated Mar. 18, 2019, pp. 1-11.

* cited by examiner

FIG. 1
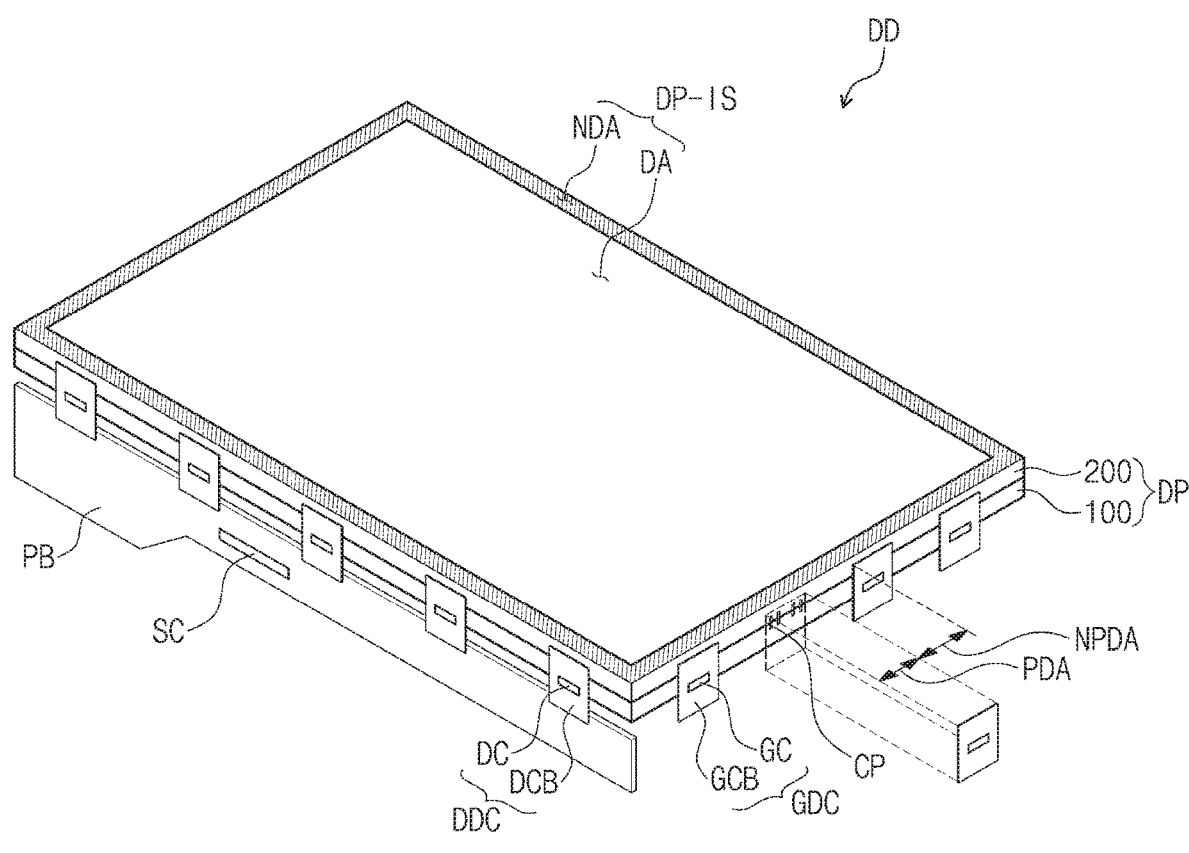
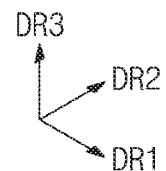

FIG. 7B
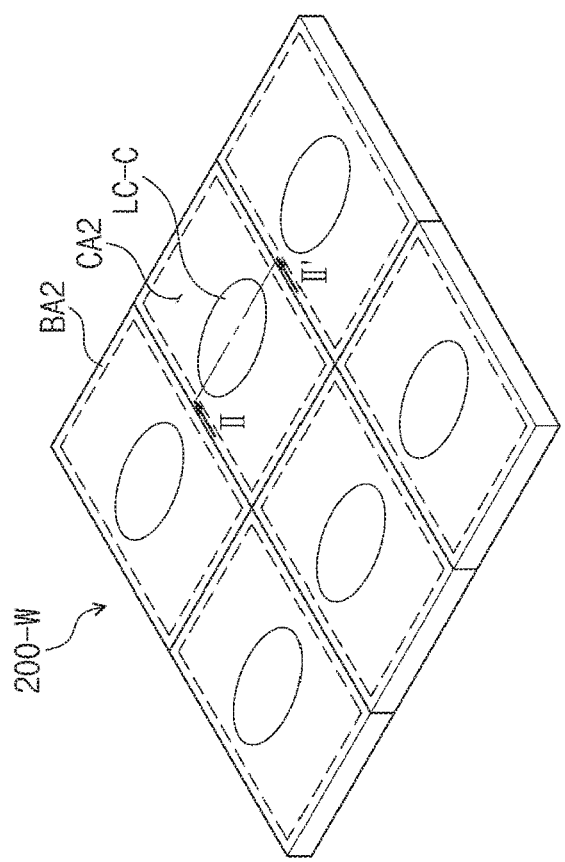
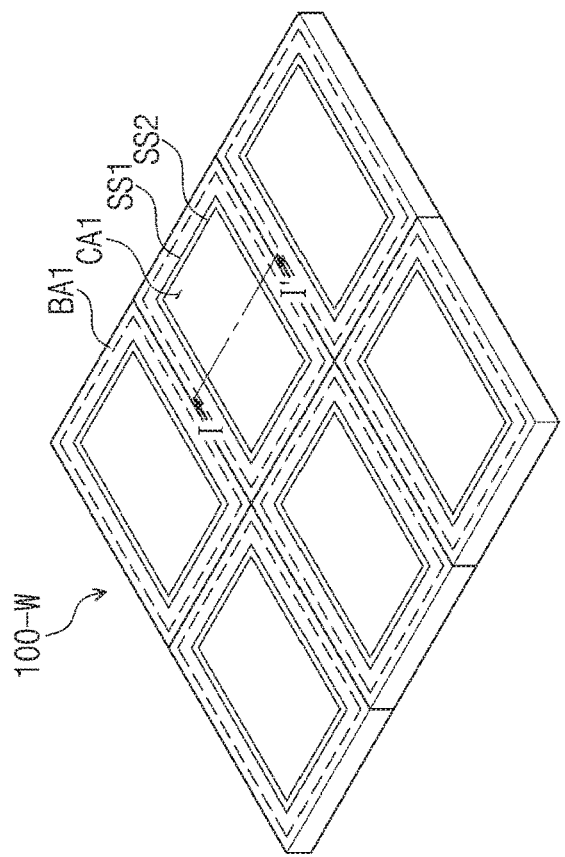

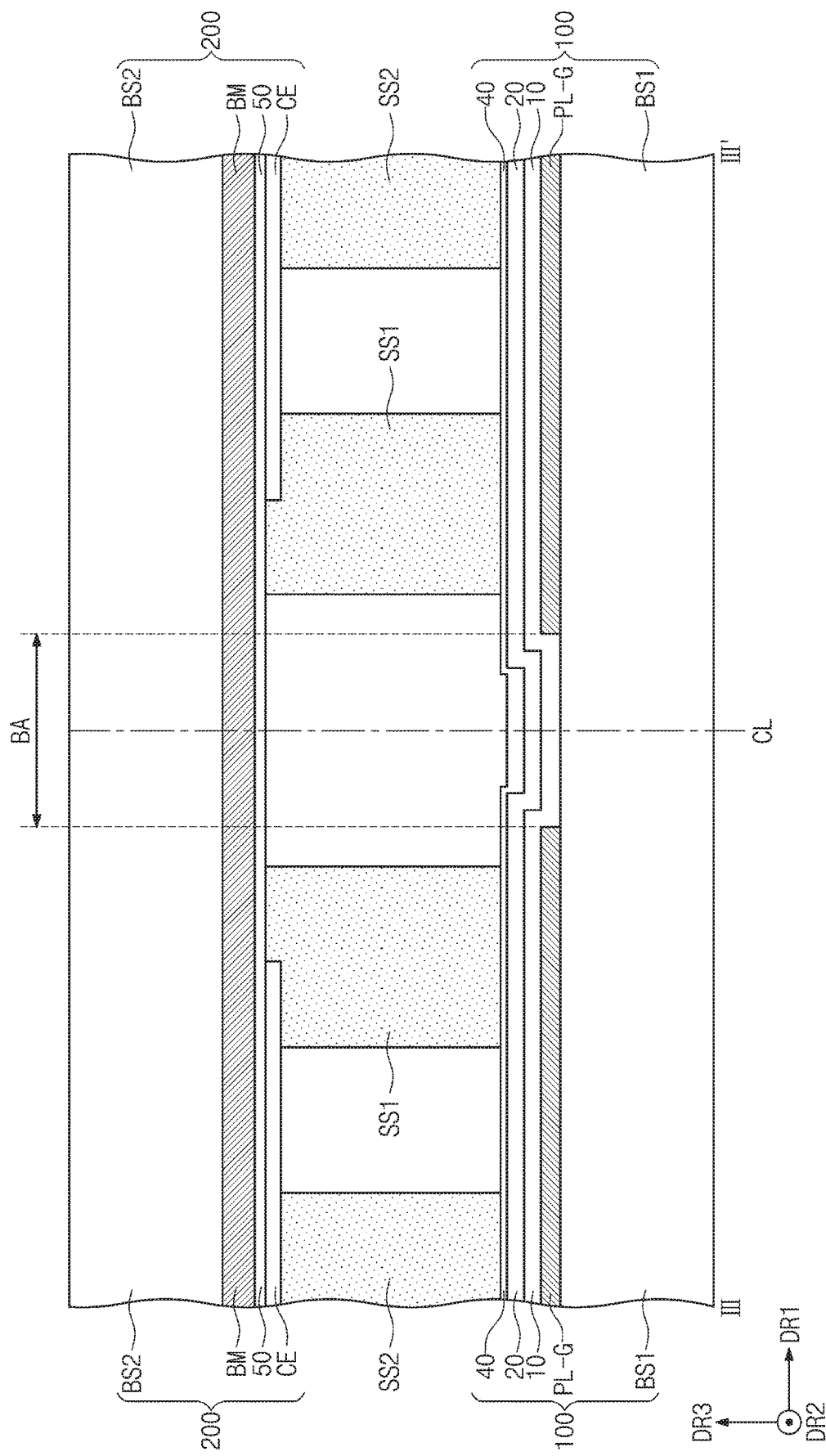

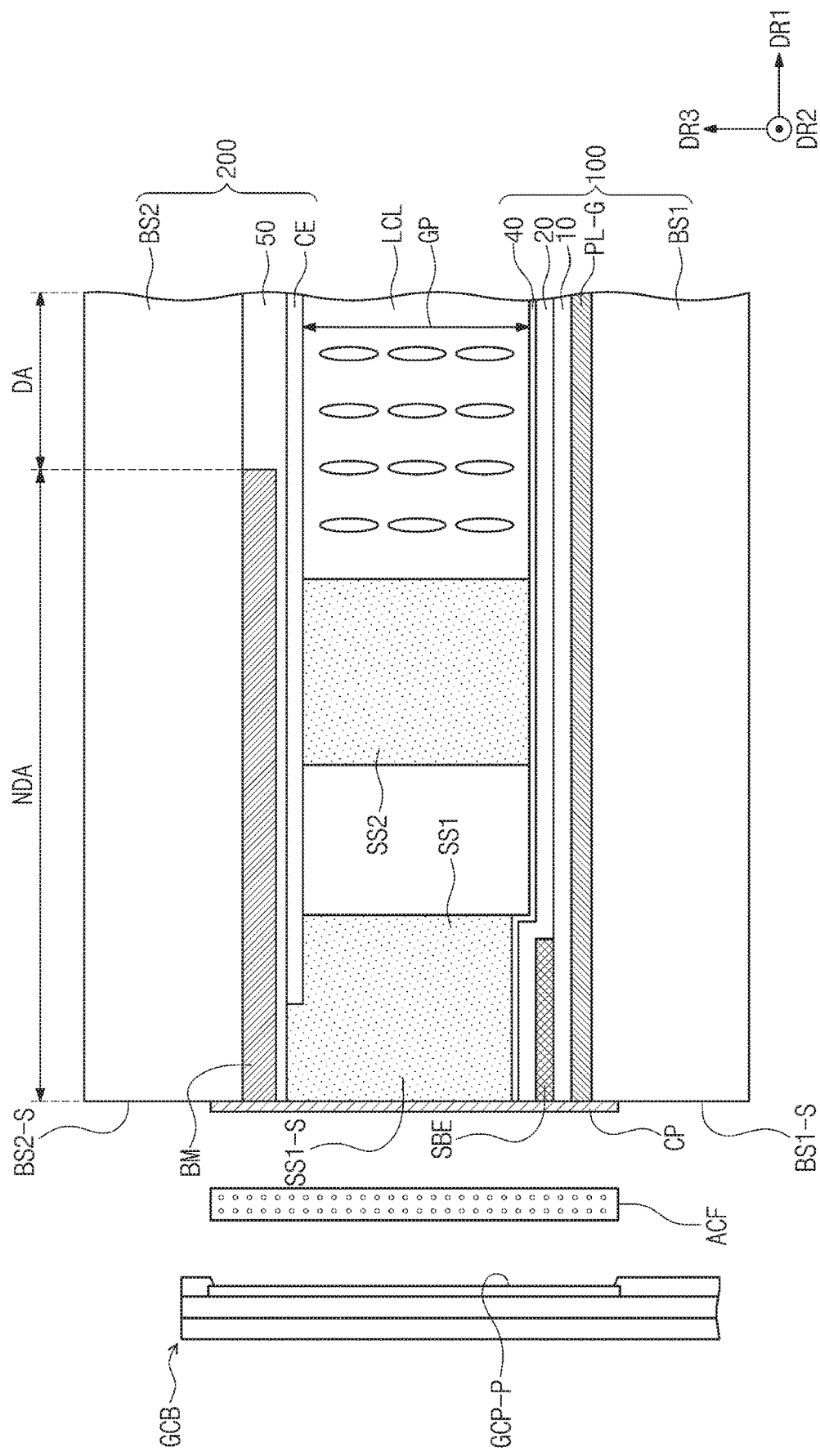

DISPLAY PANEL AND METHOD OF FABRICATING THE SAME

CROSS-REFERENCE TO RELATED APPLICATION

This application claims priority to Korean Patent Application No. 10-2018-0000385, filed on Jan. 2, 2018, and all the benefits accruing therefrom under 35 U.S.C. § 119, the content of which in its entirety is herein incorporated by reference.

BACKGROUND

1. Field

Embodiments of the invention relate to a display panel and a method of fabricating the same and, more particularly, to a display panel having a strong structure and a method of fabricating the same.

2. Description of the Related Art

Generally, a display panel may be fabricated, and then, a circuit board may be connected to the display panel. For example, in a tape automated bonding (TAB) mounting method, the circuit board may be bonded to the display panel by using an anisotropic conductive film (ACF).

Recently, display panel designing techniques for reducing a bezel area (or a non-display area) have been variously studied.

SUMMARY

Embodiments of the invention may provide a display panel capable of improving electrical connection characteristics between a circuit board and a signal line.

Embodiments of the invention may also provide a method of fabricating a display panel having a strong structure.

In an aspect of the invention, a display panel may include a first display substrate, a second display substrate facing and spaced apart from the first display substrate, a non-conductive sealing member disposed between the first display substrate and the second display substrate, a conductive sealing member disposed between the first display substrate and the second display substrate and disposed inside the non-conductive sealing member when viewed in a plan view, and a connection pad coupled to a side surface of the first display substrate and a side surface of the non-conductive sealing member.

The first display substrate may include a first base substrate, a thin film transistor disposed on the first base substrate, at least one insulating layer disposed on the first base substrate, a pixel electrode disposed on the first base substrate and connected to the thin film transistor, a signal line disposed on the first base substrate, and a voltage supply line disposed on the first base substrate and connected to the conductive sealing member. The signal line may include an end portion overlapping with the non-conductive sealing member and connected to the connection pad.

The non-conductive sealing member may include a first synthetic resin and first inorganic fillers mixed with the first synthetic resin.

The conductive sealing member may include a second synthetic resin and conductive particles mixed with the second synthetic resin.

The conductive sealing member may further include second inorganic fillers mixed with the second synthetic resin.

A diameter of the conductive particles may be less than a diameter of the first inorganic fillers.

The side surface of the non-conductive sealing member may be substantially aligned with a side surface of the first base substrate.

A side surface of the end portion of the signal line may be substantially aligned with a side surface of the first base substrate.

The second display substrate may include a second base substrate and a common electrode disposed on one surface of the second base substrate. The non-conductive sealing member and the conductive sealing member may be connected to the common electrode.

The thin film transistor may include a control electrode, an active part, and an input electrode and an output electrode disposed on a layer different from a layer on which the control electrode is disposed. The voltage supply line may be disposed on the same layer as the control electrode or the input electrode.

The display panel may further include an auxiliary electrode overlapping with the end portion of the signal line. The signal line may be disposed on the same layer as the control electrode.

The auxiliary electrode may be disposed on the same layer as the input electrode.

The auxiliary electrode may be connected to the end portion of the signal line.

The insulating layer may include a plurality of color filters. One of the color filters may overlap with the pixel electrode.

The insulating layer may further include a first inorganic layer disposed under the plurality of color filters, and a second inorganic layer disposed on the plurality of color filters.

Another of the plurality of color filters may overlap with at least one of the non-conductive sealing member or the conductive sealing member.

A thickness of the end portion of the signal line may be greater than a thickness of the signal line not overlapping with the non-conductive sealing member.

The end portion of the signal line may be spaced apart from a top surface of the first base substrate.

Conductive sludge may be disposed between the end portion of the signal line and a portion of the top surface of the first base substrate, from which the end portion of the signal line is spaced apart.

At least one of the non-conductive sealing member or the conductive sealing member may form a closed perimeter around the display panel when viewed in a plan view.

In another aspect of the invention, a display panel may include a first display substrate, a second display substrate facing and spaced apart from the first display substrate, a non-conductive sealing member disposed between the first display substrate and the second display substrate, and a connection pad coupled to a side surface of the first display substrate and a side surface of the non-conductive sealing member.

The first display substrate may include a first base substrate including a side surface substantially aligned with the side surface of the non-conductive sealing member, a signal line disposed on a top surface of the first base substrate and including an end portion overlapping with the non-conductive sealing member and connected to the connection pad, and an auxiliary electrode connected to the end portion of the signal line and the connection pad.

The second display substrate may include a second base substrate, and a common electrode disposed on a bottom surface of the second base substrate and overlapping with the non-conductive sealing member.

In still another aspect, a method of fabricating a display panel may include providing a first work display substrate including first cell areas and a first boundary area dividing the first cell areas, providing a second work display substrate including second cell areas corresponding to the first cell areas and a second boundary area corresponding to the first boundary area, forming a first sealing member and a second sealing member in each of the first cell areas, providing a liquid crystal material to each of the second cell areas, coupling the first work display substrate and the second work display substrate to form a work display panel, cutting the work display panel along the first boundary area to separate a preliminary display panel from the work display panel, grinding a side surface of the preliminary display panel, and forming a connection pad on the side surface of the preliminary display panel. The second sealing member may be disposed inside the first sealing member when viewed in a plan view. A height of the first sealing member may be greater than a height of the second sealing member.

BRIEF DESCRIPTION OF THE DRAWINGS

The above and other aspects and features of the present invention will become more apparent by describing in further detail exemplary embodiments thereof with reference to the accompanying drawings, in which:

FIG. 1 is a perspective view illustrating a display device according to an embodiment of the invention;

FIG. 7B is a perspective view illustrating a first work display substrate and a second work display substrate according to an embodiment of the invention;

FIG. 7D is a cross-sectional view illustrating a work display panel according to an embodiment of the invention;

FIGS. 8 to 15 are cross-sectional views illustrating pad areas according to some embodiments of the invention.

DETAILED DESCRIPTION OF THE EMBODIMENTS

Figure 2:
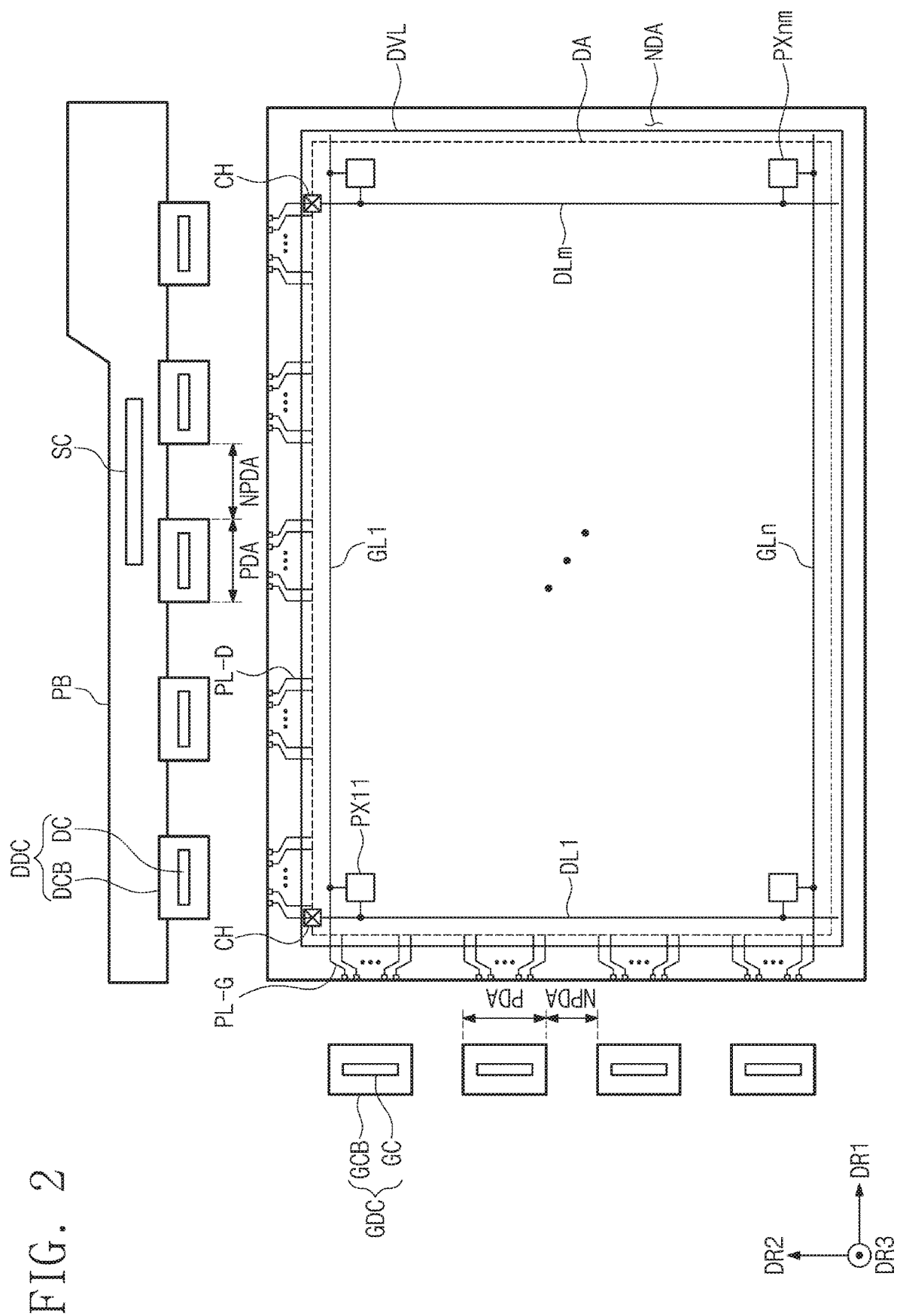
FIG. 2 is a plan view illustrating a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

FIG. 1 is a perspective view illustrating a display device DD according to an embodiment of the invention. FIG. 2 is a plan view illustrating the display device DD according to an embodiment of the invention.

Referring to FIGS. 1 and 2, the display device DD includes a display panel DP, a gate driving unit GDC, a data driving unit DDC, a main circuit board PB, and a signal controller SC. Even though not shown in the drawings, the display device DD may further include a chassis member or a molding member and may further include a backlight unit in accordance with a kind of the display panel DP.

The display panel DP may be a liquid crystal display panel, a plasma display panel, an electrophoretic display panel, a microelectromechanical system (MEMS) display panel, an electrowetting display panel, or an organic light emitting display panel. However, the display panel DP is not limited to any specific kind of display panels.

The display panel DP may include a first display substrate 100 and a second display substrate 200 facing the first display substrate 100. The second display substrate 200 may be spaced apart from the first display substrate 100. Even though not clearly shown in FIG. 1, a cell gap may be formed between the first display substrate 100 and the second display substrate 200. A gray scale display layer for generating an image may be disposed between the first display substrate 100 and the second display substrate 200. The gray scale display layer may be a display element layer such as a liquid crystal layer, an organic light emitting layer or an electrophoretic layer in accordance with a kind of the display panel.

As illustrated in FIG. 1, the display panel DP may display an image through a display surface DP-IS. The display surface DP-IS is parallel to a plane defined by a first directional axis DR1 and a second directional axis DR2. The display surface DP-IS may include a display area DA and a non-display area NDA. The non-display area NDA may be defined along a border of the display surface DP-IS and may surround the display area DA.

A normal direction of the display surface DP-IS (i.e., a thickness direction of the display panel DP) is indicated by a third directional axis DR3. Hereinafter, a front surface (or a top surface) and a rear surface (or a bottom surface) of each of layers or units are defined by the third directional axis DR3. However, the first to third directional axes DR1, DR2 and DR3 of the present embodiment are illustrated as an example. However, directions indicated by the first to third directional axes DR1, DR2 and DR3 may be relative concepts, and relation thereof may be defined differently from the present embodiment. Hereinafter, first to third directions are the directions indicated by the first to third directional axes DR1, DR2 and DR3, respectively, and are indicated by the same reference designators as the first to third directional axes DR1, DR2 and DR3.

The display panel DP having the planar display surface DP-IS is illustrated in the present embodiment. However, embodiments of the invention are not limited thereto. In other embodiments, the display device DD may include a curved display surface or a three-dimensional (3D) display surface. The 3D display surface may include a plurality of display areas indicated by different directions.

The gate driving unit GDC and the data driving unit DDC may include circuit boards GCB and DCB and driving chips GC and DC, respectively. Each of the circuit boards GCB and DCB has a structure in which an insulating layer and a conductive layer are stacked. The conductive layer may include a plurality of signal lines. The gate driving unit GDC and the data driving unit DDC may be coupled to a side surface of the display panel DP so as to be electrically connected to signal lines of the display panel DP. Since the gate driving unit GDC and the data driving unit DDC are coupled to the side surface of the display panel DP, the non-display area NDA may be reduced.

In FIG. 1, one of a plurality of the gate driving units GDC is separated from the side surface of the display panel DP for the purpose of ease and convenience in description and illustration. A connection pad CP is disposed on the side surface of the display panel DP, which is connected to the gate driving unit GDC.

The connection pad CP may be provided in plurality to correspond to the circuit board GCB. The connection pads CP may be spaced apart from each other in the second direction DR2. The connection pad CP is connected to a pad (not shown) of the circuit board GCB.

A position and a shape of the connection pad CP may be also distributed on the side surface of the display panel DP, which is connected to the data driving unit DDC. The connection pad CP may include metal paste. The metal paste includes a mixture of a metal and an insulating material. The connection pad CP may include silver paste.

Pad areas PDA and non-pad areas NPDA may be defined in the side surface or an edge of the display panel DP, to which the gate driving unit GDC and the data driving unit DDC are connected. The gate driving unit GDC and the data driving unit DDC may be connected to the pad areas PDA. End portions of signal lines PL-G and PL-D may be disposed in the pad areas PDA. In the present embodiment, the gate driving unit GDC and the data driving unit DDC are coupled to different side surfaces of the display panel DP. However, embodiments of the invention are not limited thereto. In another embodiment, the gate driving unit GDC and the data driving unit DDC may be coupled to the same side surface of the display panel DP. In still another embodiment, the gate driving unit GDC may be integrated on the display panel DP through an oxide silicon gate driver circuit (OSG) process or an amorphous silicon gate driver circuit (ASG) process, and the data driving unit DDC may be coupled to the side surface of the display panel DP. Unlike the gate driving unit GDC and the data driving unit DDC, only a circuit board may be connected to the side surface of the display panel DP.

The main circuit board PB may be connected to the circuit board DCB of the data driving unit DDC. The main circuit board PB may be electrically connected to the circuit board DCB of the data driving unit DDC through an anisotropic conductive film (ACF) or solder balls. The signal controller SC may be mounted on the main circuit board PB. The signal controller SC receives image data and control signals from an external graphic controller (not shown). The signal controller SC may provide control signals to the gate driving unit GDC and the data driving unit DDC.

In an embodiment of the invention, the display device DD may further include a main circuit board connected to the circuit board GCB of the gate driving unit GDC. In an embodiment of the invention, the driving chip DC of the data driving unit DDC may be mounted on the main circuit board PB.

FIG. 2 illustrates planar arrangement of signal lines GL1 to GLn, DL1 to DLm, PL-G and PL-D and pixels PX11 to PXnm, which are included in the display panel DP. The signal lines GL1 to GLn, DL1 to DLm, PL-G and PL-D may include a plurality of gate lines GL1 to GLn, a plurality of data lines DL1 to DLm, and auxiliary signal lines PL-G and PL-D.

The gate lines GL1 to GLn extend in the first direction DR1 and are arranged in the second direction DR2, and the data lines DL1 to DLm are insulated from the gate lines GL1 to GLn and intersect the gate lines GL1 to GLn.

The gate lines GL1 to GLn and the data lines DL1 to DLm overlap with the display area DA. The auxiliary signal lines PL-G and PL-D may overlap with the non-display area NDA and may be connected to the gate lines GL1 to GLn and the data lines DL1 to DLm.

First auxiliary signal lines PL-G connected to the gate lines GL1 to GLn may be disposed on the same layer as the gate lines GL1 to GLn. The first auxiliary signal line PL-G and the gate line connected to each other may constitute a single unitary body. Second auxiliary signal lines PL-D connected to the data lines DL1 to DLm may be disposed on a layer different from a layer on which the data lines DL1 to DLm are disposed. Each of the data lines DL1 to DLm may be electrically connected to a corresponding one of the second auxiliary signal lines PL-D through a contact hole CH penetrating at least one insulating layer disposed between the second auxiliary signal lines PL-D and the data lines DL1 to DLm. In FIG. 2, two contact holes CH are illustrated as an example.

In an embodiment of the invention, the contact hole CH may be omitted, and the data lines DL1 to DLm and the second auxiliary signal lines PL-D may be disposed on the same layer. In the present embodiment, the gate lines GL1 to GLn and the first auxiliary signal lines PL-G are distinguished from each other. However, in another embodiment, the gate line and the first auxiliary signal line connected to each other may be defined as one signal line. In this case, the gate line and the first auxiliary signal line connected to each other may be defined as different portions of the one signal line.

The signal lines GL1 to GLn, DL1 to DLm, PL-G and PL-D may further include other signal lines. For example, a voltage supply line DVL may further be included in the signal lines. The voltage supply line DVL may receive a DC voltage. The DC voltage may be a ground voltage. The voltage supply line DVL may overlap with the non-display area NDA and may be disposed on the same layer as the data lines DL1 to DLm. The voltage supply line DVL may have a closed line shape (e.g., a closed loop shape) or an opened loop shape. In an embodiment, the voltage supply line DVL may include portions disposed on different layers.

In addition, the signal lines may further include signal lines for electrically connecting a plurality of the gate driving units GDC to each other and signal lines for electrically connecting the plurality of gate driving units GDC to the main circuit board PB.

Each of the pixels PX11 to PXnm is connected to a corresponding one of the plurality of gate lines GL1 to GLn and a corresponding one of the plurality of data lines DL1 to DLm. Each of the pixels PX11 to PXnm may include a pixel driving circuit and a display element.

The pixels PX11 to PXnm arranged in a matrix form are illustrated as an example in FIG. 2. However, embodiments of the invention are not limited thereto. In another embodiment, the pixels PX11 to PXnm may be arranged in a pentile form.

Figure 3:
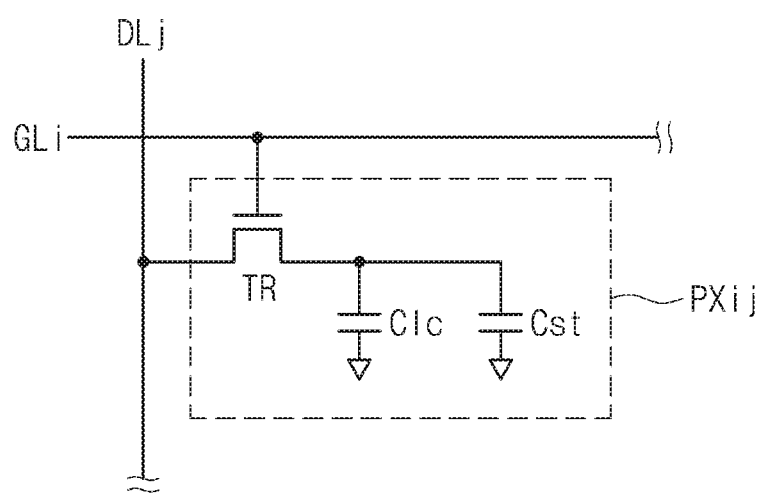
FIG. 3 is an equivalent circuit diagram of a pixel according to an embodiment of the invention.

FIG. 3 is an equivalent circuit diagram of a pixel PXij according to an embodiment of the invention. The pixel PXij connected to an $i^{th}$ gate line GLi and a $i^{th}$ data line DLj is illustrated as an example in FIG. 3. Hereinafter, a liquid crystal display panel will be described as an example of the display panel DP.

The pixel PXij may include a thin film transistor TR (hereinafter, referred to as 'a transistor'), a liquid crystal capacitor Clc, and a storage capacitor Cst. The liquid crystal capacitor Clc may correspond to the display element, and the transistor TR and the storage capacitor Cst may constitute the pixel driving circuit. The numbers of the transistor TR and the storage capacitor Cst may be changed depending on an operating mode of the liquid crystal display panel. In another embodiment, the storage capacitor Cst may be omitted.

The liquid crystal capacitor Clc may store a pixel voltage outputted from the transistor TR. Arrangement of liquid crystal directors included in a liquid crystal layer LCL (shown in at least FIGS. 5A to 5C) may be changed depending on the amount of charges stored in the liquid crystal capacitor Clc. In other words, the liquid crystal directors may be controlled by an electric field formed between two electrodes of the liquid crystal capacitor Clc. Light incident to the liquid crystal layer LCL may be transmitted or blocked according to the arrangement of the liquid crystal directors.

The storage capacitor Cst is connected in parallel to the liquid crystal capacitor Clc. The storage capacitor Cst maintains the arrangement of the liquid crystal directors for a certain period.

Figure 4:
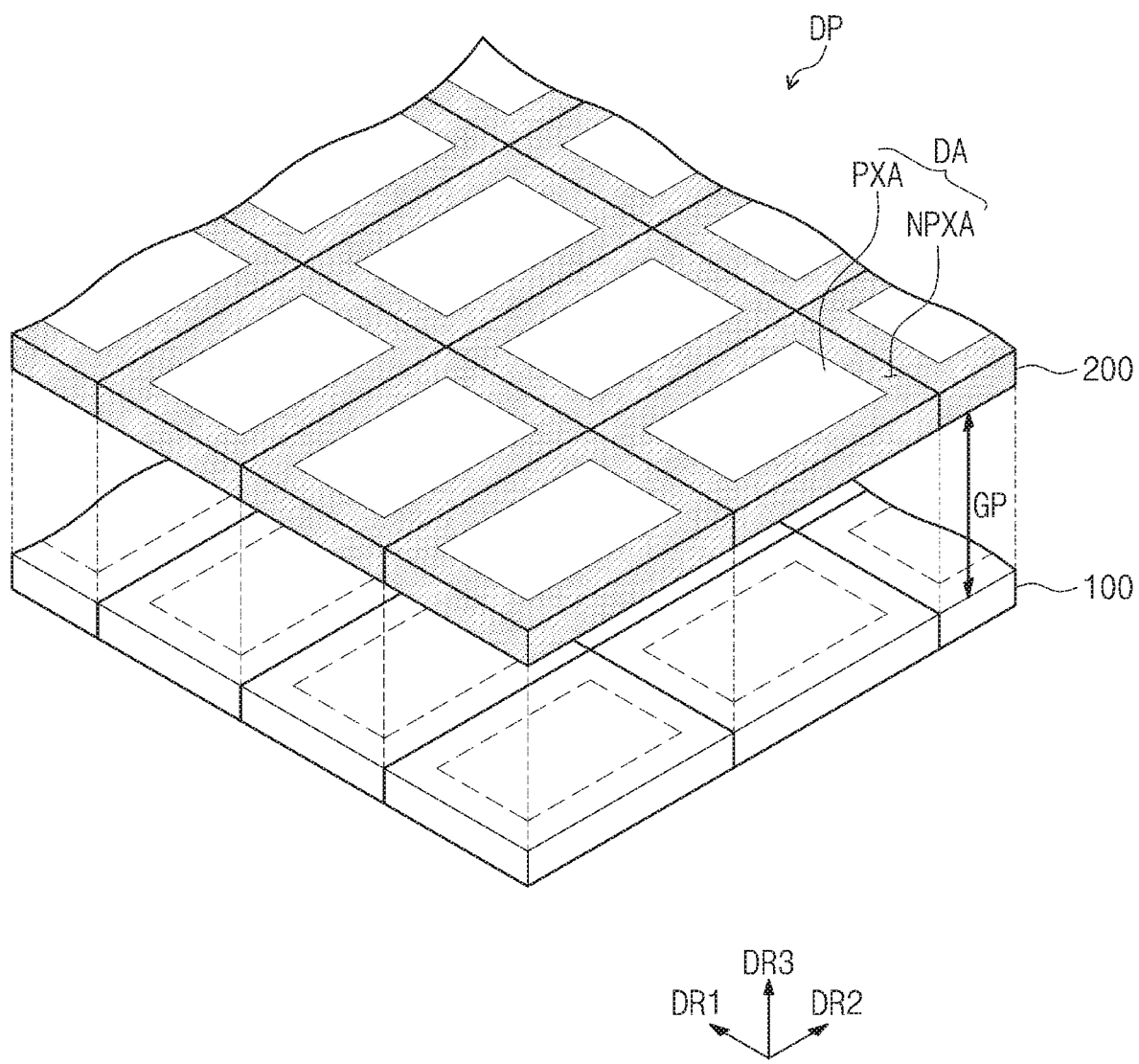
FIG. 4 is a perspective view illustrating a display area of a display panel according to an embodiment of the invention.
Figure 5A:
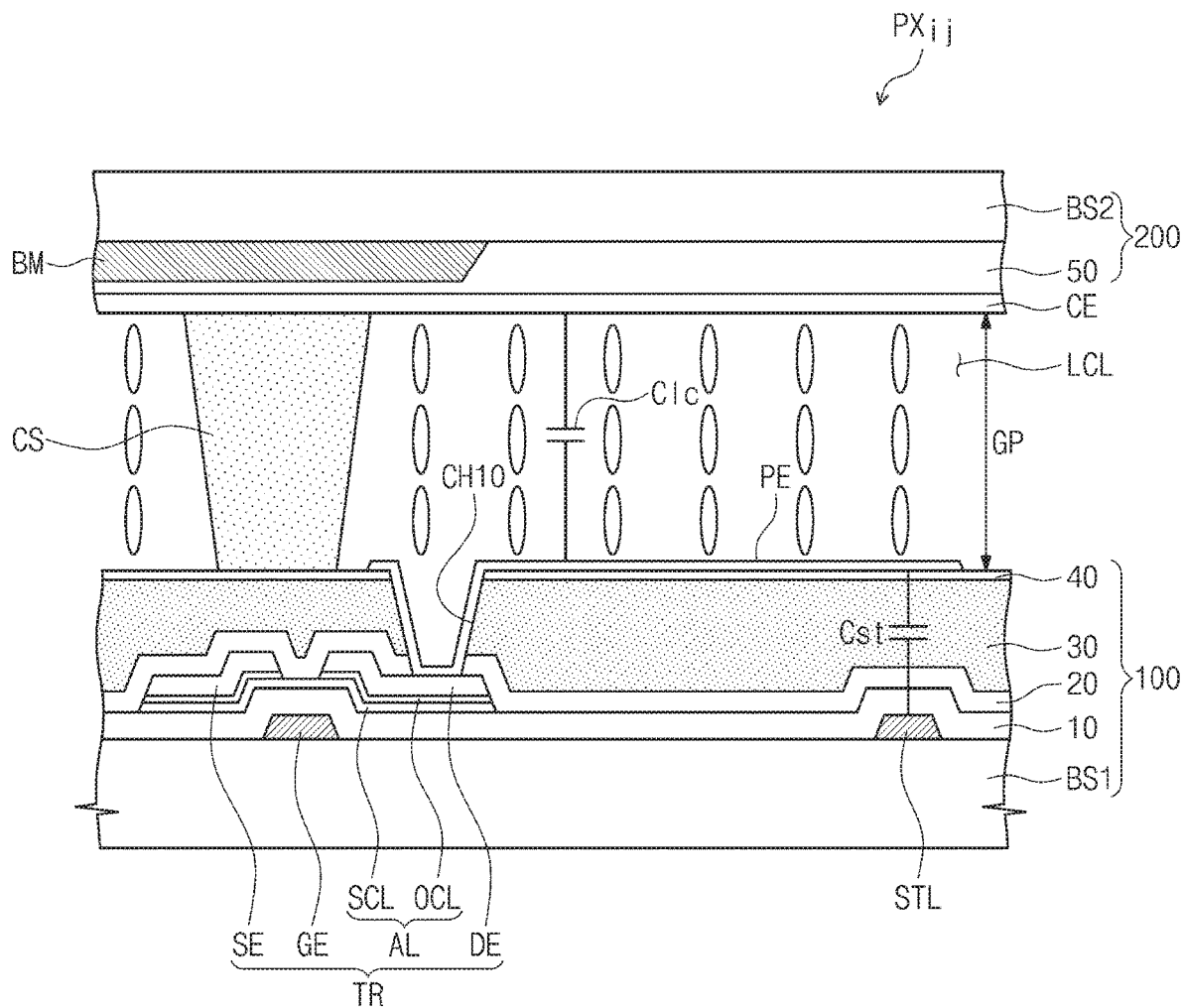
FIGS. 5A to 5C are cross-sectional views illustrating display areas of display panels according to some embodiments of the invention.
Figure 5B:
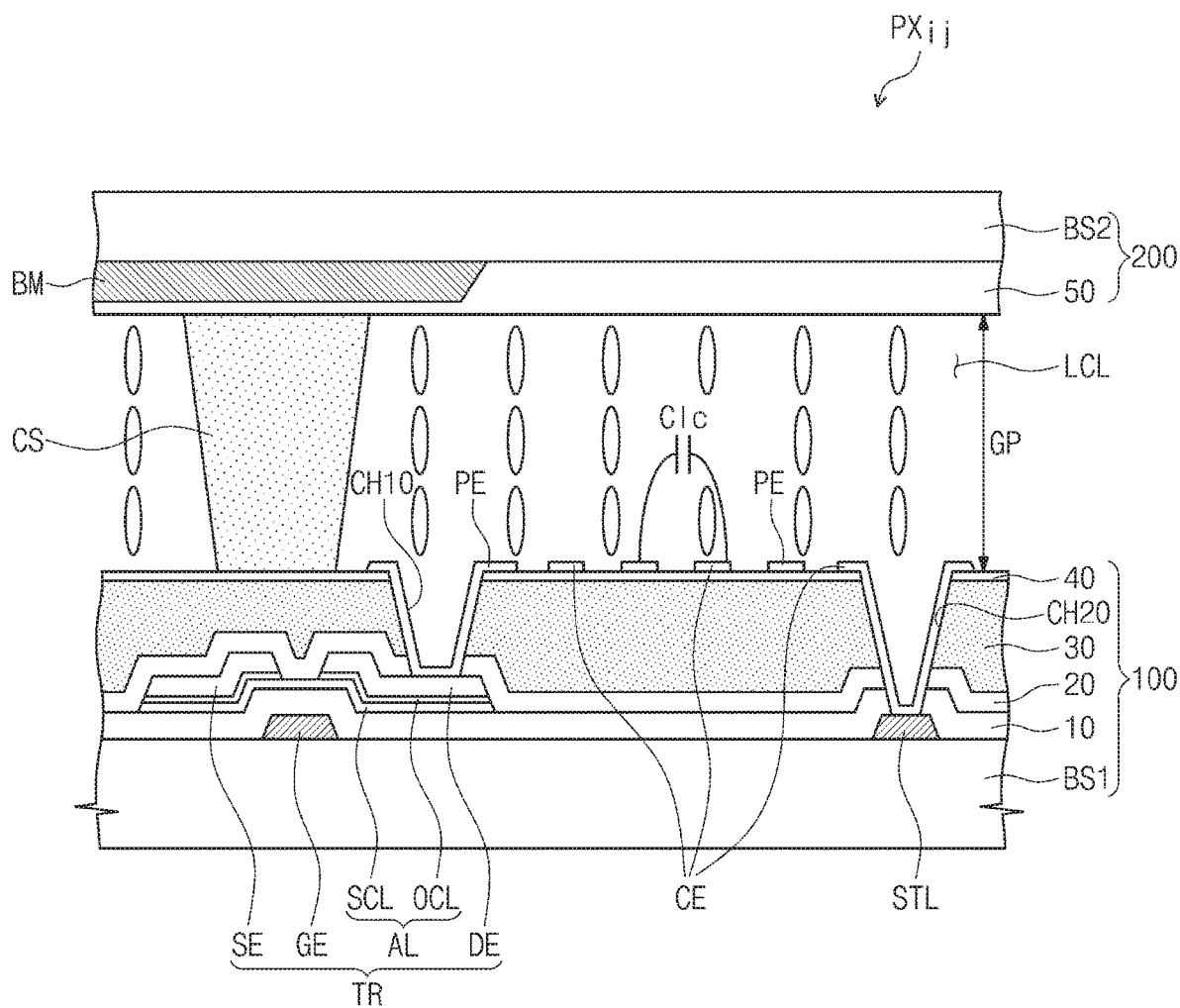
Figure 5C:
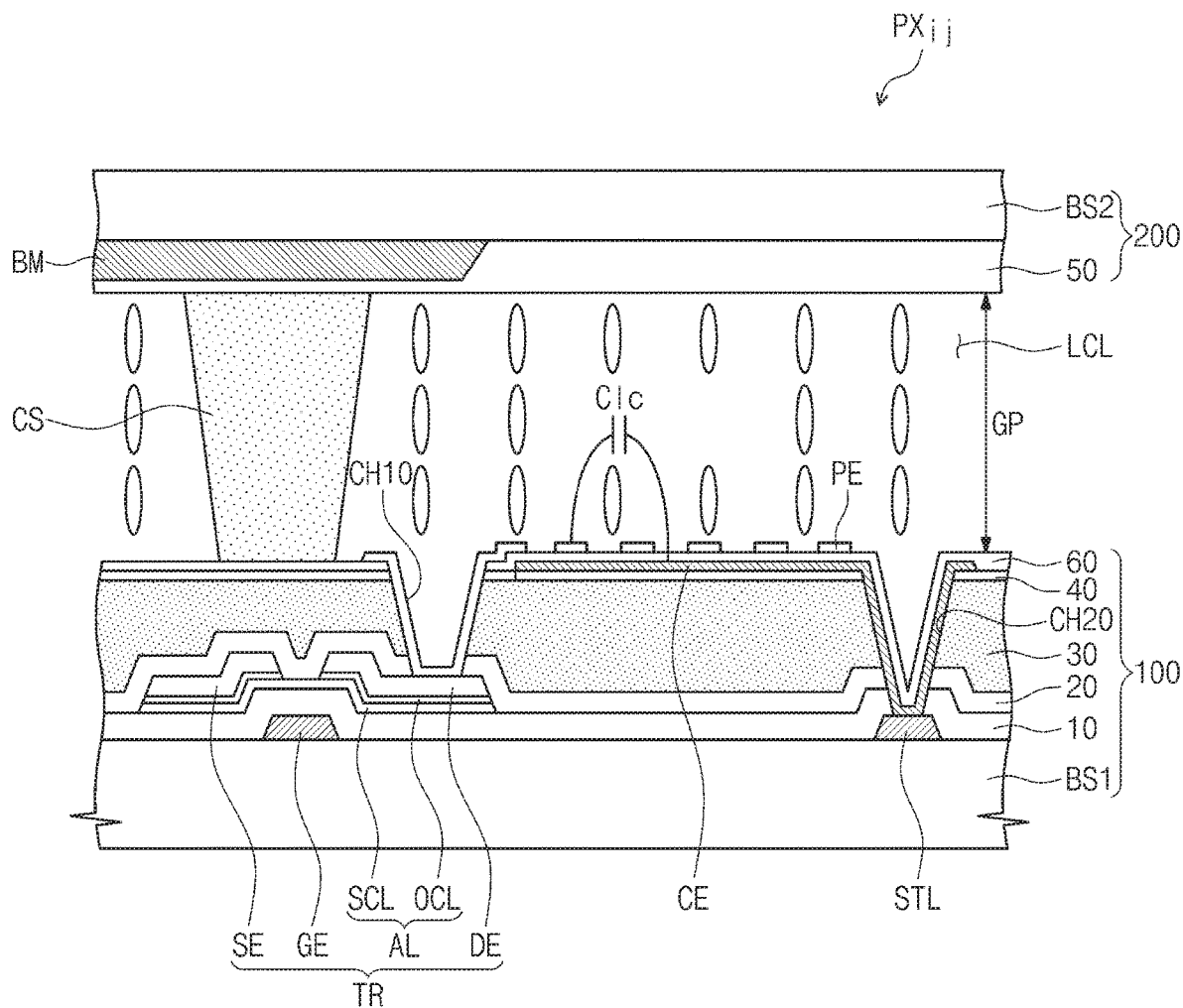

FIG. 4 is a perspective view illustrating the display area DA of the display panel DP according to an embodiment of the invention. FIGS. 5A to 5C are cross-sectional views illustrating display areas DA of display panels DP according to some embodiments of the invention.

FIG. 4 illustrates a central portion of the display area DA. The display area DA may include pixel areas PXA and a peripheral area NPXA. The peripheral area NPXA may surround each of the pixel areas PXA and may correspond to a boundary area between the pixel areas PXA. The pixel areas PXA may be arranged in the same form as the pixels PX11 to PXnm (see FIG. 2).

The pixel areas PXA may correspond to areas that substantially display colors. The pixel areas PXA may correspond to transmission areas in a transmission-type display panel or may correspond to light emitting areas in a light emitting type display panel. The pixel areas PXA may be classified into a plurality of groups on the basis of colors displayed by the pixel areas PXA. In other words, each of the pixel areas PXA may display one of primary colors. The primary colors may include a red color, a green color, a blue color, and a white color.

A cell gap GP is defined between the first display substrate 100 and the second display substrate 200. The signal lines GL1 to GLn, DL1 to DLm, PL-G and PL-D described with reference to FIG. 2 may be included in one of the first display substrate 100 and the second display substrate 200. The pixels PX11 to PXnm may be included in one of the first display substrate 100 and the second display substrate 200. Alternatively, some components of the pixels PX11 to PXnm may be included in the first display substrate 100, and other components of the pixel PX11 to PXnm may be included in the second display substrate 200. The pixels PX11 to PXnm may be disposed between a base substrate of the first display substrate 100 and a base substrate of the second display substrate 200.

FIGS. 5A to 5C illustrates cross-sectional views corresponding to pixels PXij of liquid crystal display panels of different modes.

As illustrated in FIGS. 5A to 5C, the transistor TR includes a control electrode GE connected to the $i^{th}$ gate line GLi, an active part AL overlapping with the control electrode GE, an input electrode SE connected to the $j^{th}$ data line DLi, and an output electrode DE spaced apart from the input electrode SE.

The liquid crystal capacitor Clc includes a pixel electrode PE and a common electrode CE. The storage capacitor Cst includes the pixel electrode PE and a portion of a storage line STL overlapping with the pixel electrode PE.

The $i^{th}$ gate line GLi and the storage line STL are disposed on one surface of a first base substrate BS1 of the first display substrate 100. The control electrode GE is branched from the $i^{th}$ gate line GLi. The $i^{th}$ gate line GLi and the storage line STL may include a metal (e.g., aluminum (Al), silver (Ag), copper (Cu), molybdenum (Mo), chromium (Cr), tantalum (Ta), or titanium (Ti)) or any alloy thereof. In an embodiment, the $i^{th}$ gate line GLi and the storage line STL may have a multi-layered structure (e.g., a titanium layer and a copper layer).

The first base substrate BS1 may be a glass substrate or a plastic substrate. A first insulating layer 10 may be disposed on the one surface of the first base substrate BS1 and may cover the control electrode GE and the storage line STL. The first insulating layer 10 may include at least one of an inorganic material or an organic material. For example, the first insulating layer 10 may include a silicon nitride layer, a silicon oxynitride layer, a silicon oxide layer, a titanium oxide layer, or an aluminum oxide layer. In an embodiment, the first insulating layer 10 may include a multi-layered structure (e.g., a silicon nitride layer and a silicon oxide layer).

The active part AL overlapping with the control electrode GE is disposed on the first insulating layer 10. The active part AL may include a semiconductor layer SCL and an ohmic contact layer OCL. The semiconductor layer SCL is disposed on the first insulating layer 10, and the ohmic contact layer OCL is disposed on the semiconductor layer SCL.

The semiconductor layer SCL may include amorphous silicon or poly-silicon. Alternatively, the semiconductor layer SCL may include a metal oxide semiconductor. The ohmic contact layer OCL may be doped with dopants. A concentration of the dopants in the ohmic contact layer OCL may be higher than a concentration of dopants in the semiconductor layer SCL. The ohmic contact layer OCL may include two portions spaced apart from each other. In an embodiment of the invention, the ohmic contact layer OCL may have a shape of one body.

The output electrode DE and the input electrode SE are disposed on the active part AL. The output electrode DE and the input electrode SE are spaced apart from each other. Each of the output electrode DE and the input electrode SE partially overlaps with the control electrode GE.

A second insulating layer 20 is disposed on the first insulating layer 10 and covers the active part AL, the output electrode DE, and the input electrode SE. The second insulating layer 20 may include at least one of an inorganic material or an organic material. For example, the second insulating layer 20 may include a silicon nitride layer, a silicon oxynitride layer, a silicon oxide layer, a titanium oxide layer, or an aluminum oxide layer. In an embodiment, the second insulating layer 20 may include a multi-layered structure (e.g., a silicon nitride layer and a silicon oxide layer).

The transistor TR having a staggered structure is illustrated as an example in FIGS. 5A to 5C. However, the structure of the transistor TR is not limited thereto. In another embodiment, the transistor TR may have a planar structure.

A third insulating layer 30 is disposed on the second insulating layer 20. The third insulating layer 30 may be a single-layered organic layer providing a flat surface. In the present embodiment, the third insulating layer 30 may include a plurality of color filters. The color filter may completely cover at least pixel area PXA (see FIG. 4). The color filters of adjacent pixels may partially overlap with each other in the peripheral area NPXA.

A fourth insulating layer 40 is disposed on the third insulating layer 30. The fourth insulating layer 40 may be an inorganic layer covering the color filters. For example, the fourth insulating layer 40 may include a silicon nitride layer, a silicon oxynitride layer, a silicon oxide layer, a titanium oxide layer, or an aluminum oxide layer. In an embodiment, the fourth insulating layer 40 may include a multi-layered structure (e.g., a silicon nitride layer and a silicon oxide layer).

As illustrated in FIG. 5A, the pixel electrode PE may be disposed on the fourth insulating layer 40. The pixel electrode PE may be connected to the output electrode DE through a contact hole CH10 penetrating the second, third and fourth insulating layers 20, 30 and 40. An alignment layer (not shown) covering the pixel electrode PE may be disposed on the fourth insulating layer 40.

A second base substrate BS2 of the second display substrate 200 may be a glass substrate or a plastic substrate. A black matrix layer BM is disposed on a bottom surface of the second base substrate BS2. The black matrix layer BM may have a shape corresponding to the peripheral area NPXA (see FIG. 4). In other words, openings corresponding to the pixel areas PXA may be defined in the black matrix layer BM.

At least one insulating layer covering the black matrix layer BM may be disposed on the bottom surface of the second base substrate BS2. In FIG. 5A, a fifth insulating layer 50 providing a flat surface is illustrated as an example on the bottom surface of the second base substrate BS2. The fifth insulating layer 50 may include an organic material.

As illustrated in FIG. 5A, the common electrode CE may be disposed on the bottom surface of the second base substrate BS2. A common voltage is applied to the common electrode CE. A value of the common voltage is different from that of the pixel voltage.

However, the cross section of the pixel PXij in FIG. 5A is illustrated as an example of the invention. In another embodiment, the first display substrate 100 and the second display substrate 200 may be turned over in the third direction DR3. In still another embodiment, the color filters may be disposed on the second display substrate 200.

The liquid crystal display panel of a vertical alignment (VA) mode is described as an example with reference to FIG. 5A. However, embodiments of the invention are not limited thereto. In other embodiments, the display panel DP may be a liquid crystal display panel of an in-plane switching (IPS) mode, a fringe-field switching (FFS) mode, a plane-to-line switching (PLS) mode, a super vertical alignment (SVA) mode, or a surface-stabilized vertical alignment (SS-VA) mode.

The liquid crystal display panel of the in-plane switching (IPS) mode is illustrated in FIG. 5B, and the liquid crystal display panel of the plane-to-line switching (PLS) mode is illustrated in FIG. 5C. As illustrated in FIG. 5B, the pixel electrode PE and the common electrode CE may be disposed on the same layer in the liquid crystal display panel of the in-plane switching (IPS) mode. Each of the pixel electrode PE and the common electrode CE may include a plurality of branch portions. The branch portions of the pixel electrode PE and the branch portions of the common electrode CE may be alternately arranged. The common electrode CE may be connected to a signal line (e.g., the storage line STL), which receives the common voltage, through a contact hole CH20.

As illustrated in FIG. 5C, in the liquid crystal display panel of the plane-to-line switching (PLS) mode, the pixel electrode PE and the common electrode CE may be disposed with a sixth insulating layer 60 interposed therebetween. The pixel electrode PE may include a plurality of branch portions or may include a plurality of slits. Positions of the pixel electrode PE and the common electrode CE may be exchanged with each other.

As illustrated in FIGS. 5A to 5C, a spacer CS may be disposed between the first display substrate 100 and the second display substrate 200. The spacer CS maintains the cell gap GP. The spacer CS may include a photosensitive organic material. The spacer CS overlaps with the peripheral area NPXA. The spacer CS may overlap with the transistor TR. The first to fourth insulating layers 10, 20, 30 and 40 illustrated in FIGS. 5A to 5C may be changed or modified. For example, an insulating layer may be additionally provided, or one or some of the insulating layers 10, 20, 30 and 40 may be omitted.

Figure 6A:
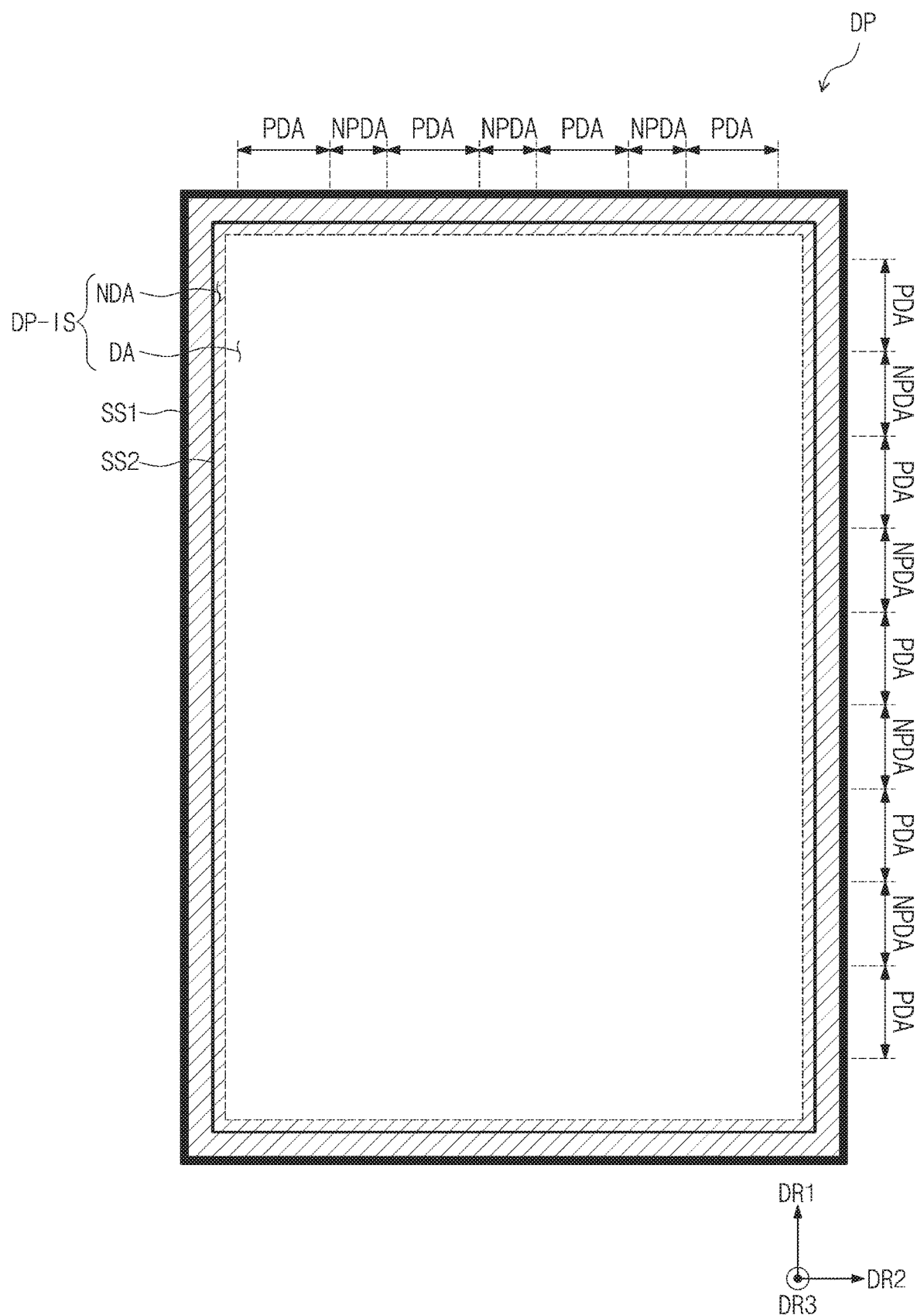
FIG. 6A is a plan view illustrating a display panel according to an embodiment of the invention.
Figure 6B:
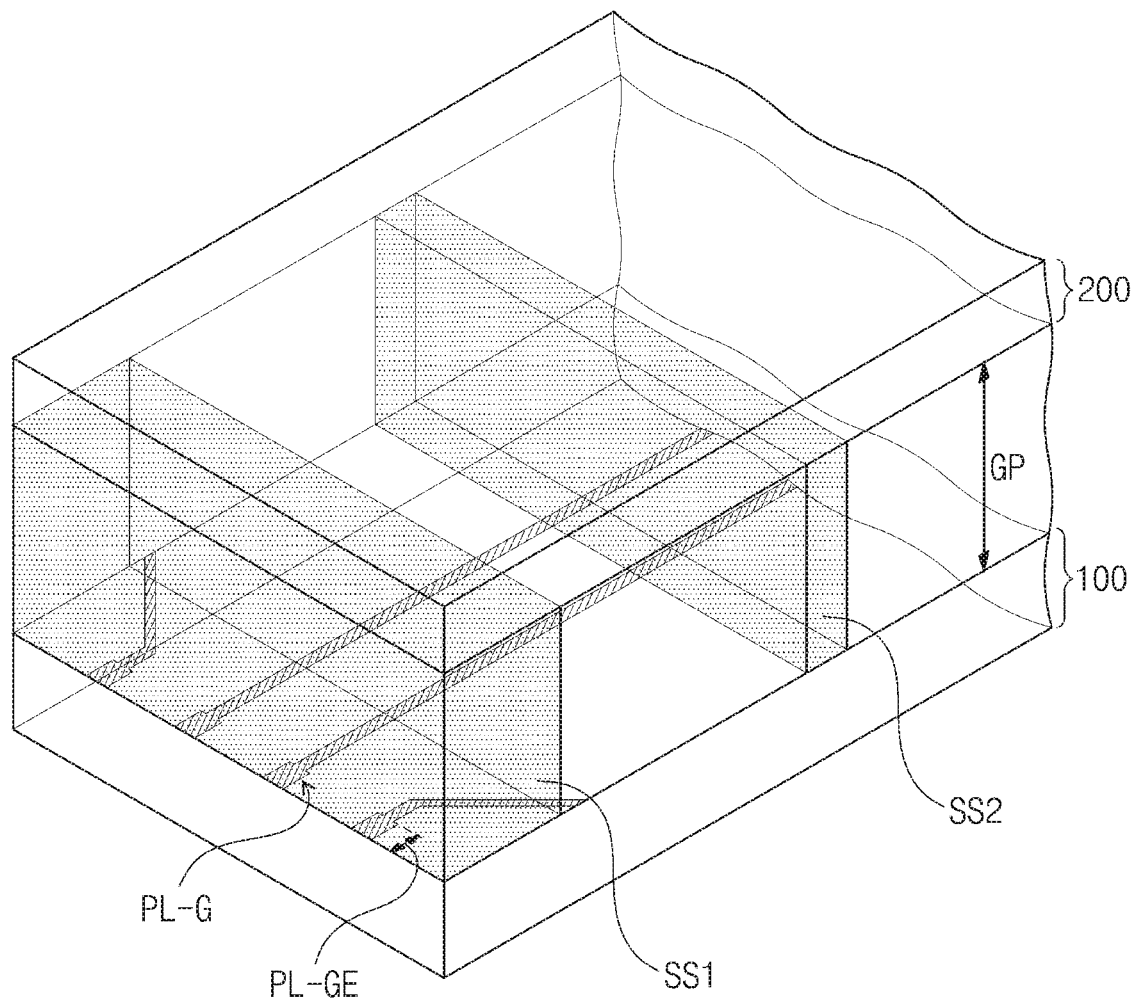
FIG. 6B is a perspective view illustrating a pad area according to an embodiment of the invention.
Figure 6C:
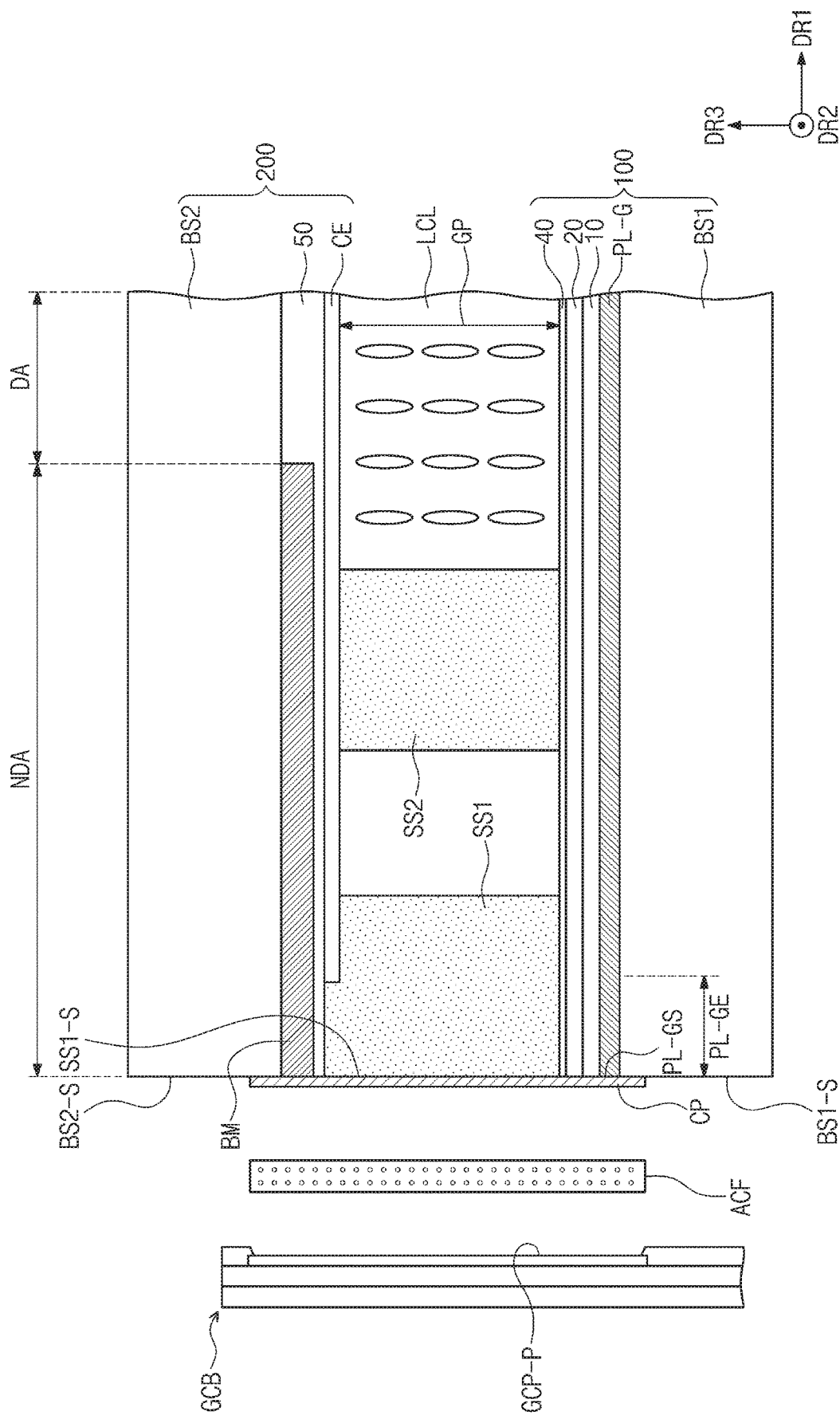
FIG. 6C is a cross-sectional view illustrating a pad area according to an embodiment of the invention.
Figure 6D:
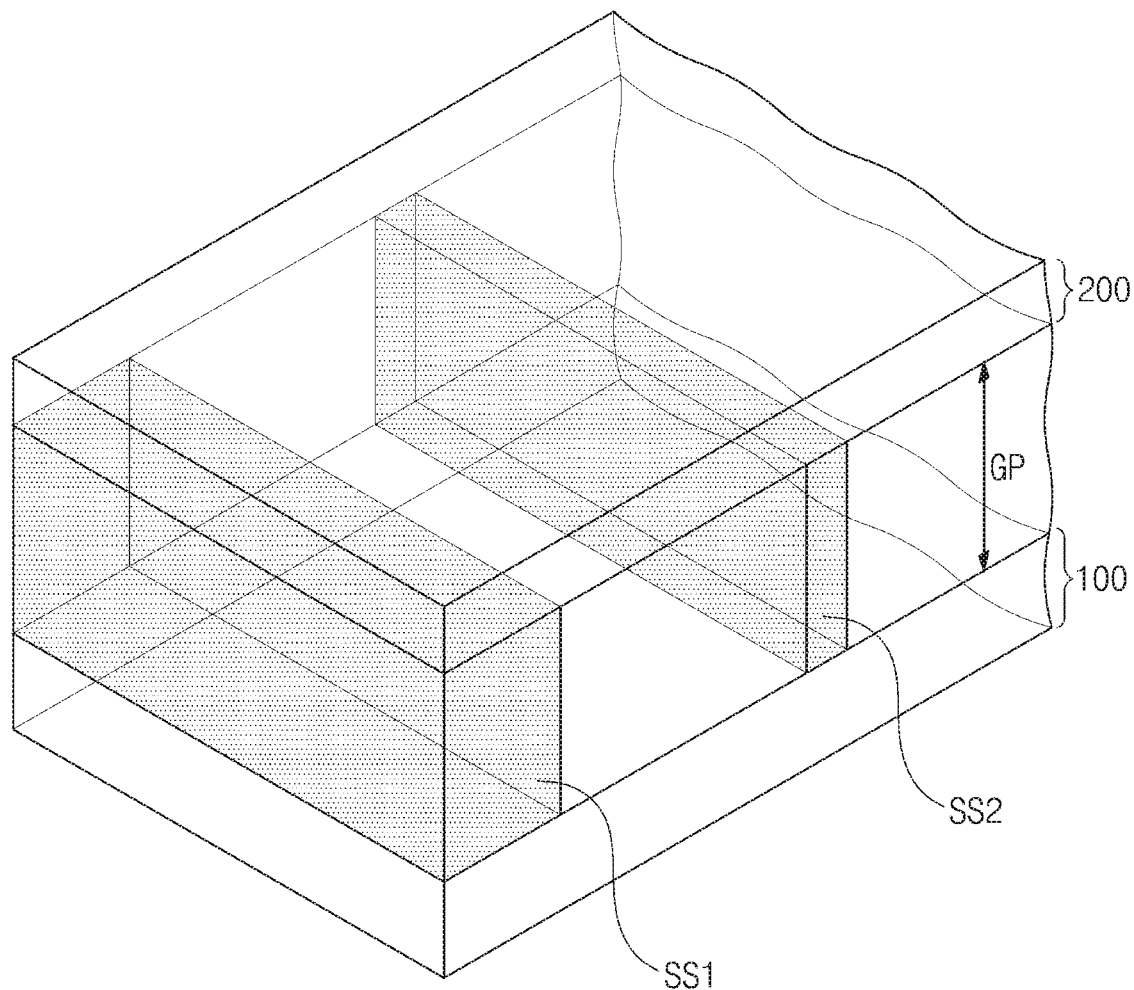
FIG. 6D is a perspective view illustrating a non-pad area according to an embodiment of the invention.
Figure 6E:
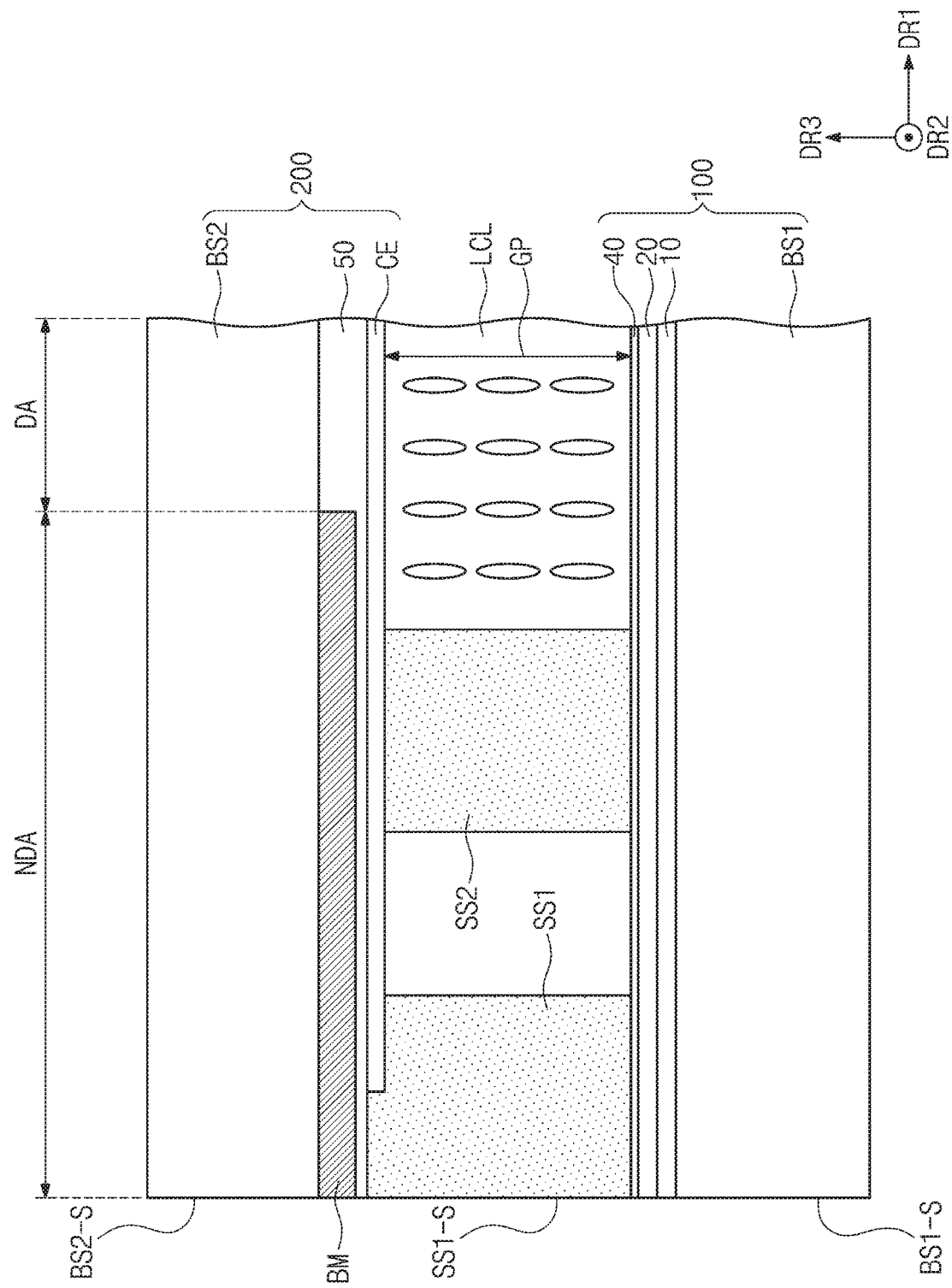
FIG. 6E is a cross-sectional view illustrating a non-pad area according to an embodiment of the invention.
Figure 6F:
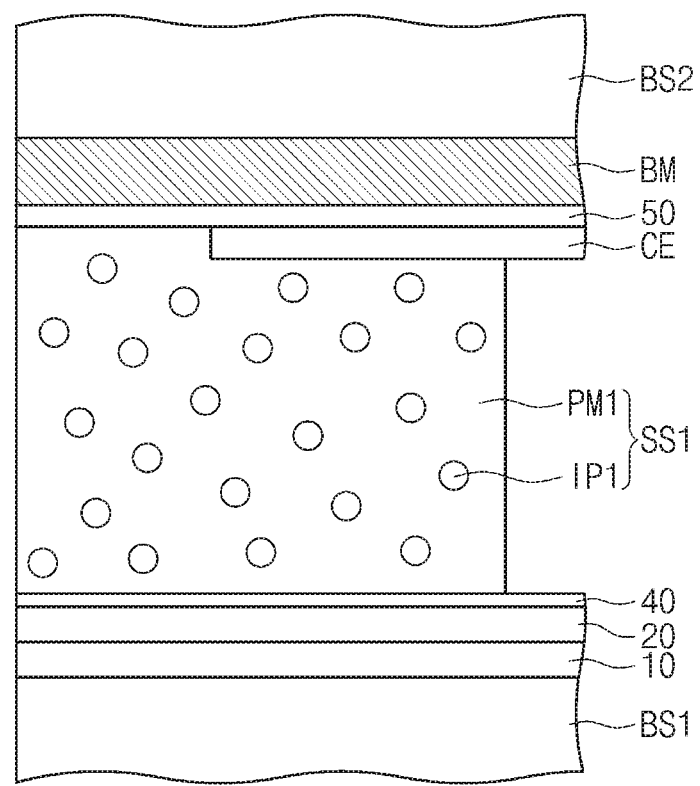
FIG. 6F is an enlarged cross-sectional view illustrating a first sealing member according to an embodiment of the invention.
Figure 6G:
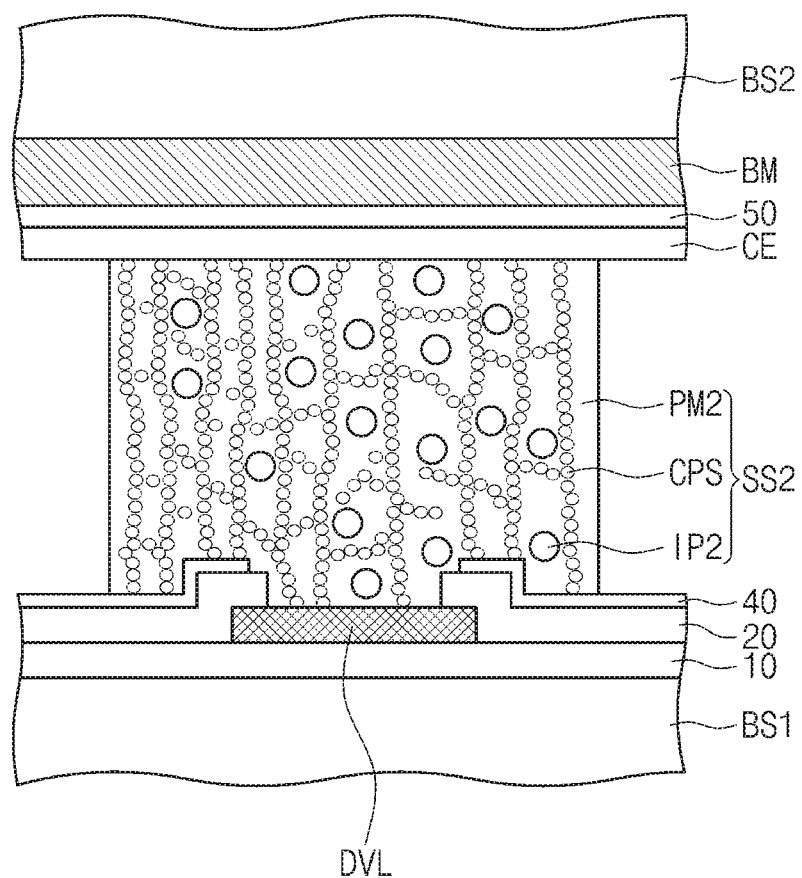
FIG. 6G is an enlarged cross-sectional view illustrating a second sealing member according to an embodiment of the invention.

FIG. 6A is a plan view illustrating a display panel DP according to an embodiment of the invention. FIG. 6B is a perspective view illustrating a pad area PDA according to an embodiment of the invention. FIG. 6C is a cross-sectional view illustrating the pad area PDA according to an embodiment of the invention. FIG. 6D is a perspective view illustrating a non-pad area NPDA according to an embodiment of the invention. FIG. 6E is a cross-sectional view illustrating the non-pad area NPDA according to an embodiment of the invention. FIG. 6F is an enlarged cross-sectional view illustrating a first sealing member SS1 according to an embodiment of the invention. FIG. 6G is an enlarged cross-sectional view illustrating a second sealing member SS2 according to an embodiment of the invention.

Planar shapes of the first and second sealing members SS1 and SS2 are illustrated in FIG. 6A. At least one of the first sealing member SS1 or the second sealing member SS2 may have a closed line shape (e.g., a closed loop shape) when viewed in a plan view. The first sealing member SS1 and the second sealing member SS2 may be spaced apart from each other. In particular, the first sealing member SS1 may be formed on an outer perimeter of the display panel and the second sealing member SS2 may be formed inside the outer perimeter of the display panel. The first sealing member SS1 and the second sealing member SS2 are disposed between the first display substrate 100 and the second display substrate 200 to form the cell gap GP.

The first and second sealing members SS1 and SS2, each of which has the closed line shape, are illustrated as an example in FIG. 6A. The second sealing member SS2 is disposed inside the first sealing member SS1 when viewed in a plan view. The second sealing member SS2 may overlap with the voltage supply line DVL illustrated in FIG. 2.

The first sealing member SS1 and the second sealing member SS2 are formed in the non-display area NDA. The first sealing member SS1 may be disposed along an edge or a perimeter of the display panel DP when viewed in a plan view. In other words, a side surface of the first sealing member SS1 may form a portion of the side surface of the display panel DP. The liquid crystal layer LCL (see FIG. 6C) may be disposed in an inner space of the cell gap GP, which is defined by the second sealing member SS2.

FIGS. 6B and 6C illustrate one pad area PDA of FIG. 6A in detail. As illustrated in FIGS. 6B and 6C, an end portion PL-GE of the auxiliary signal line PL-G overlaps with the pad area PDA. The end portion PL-GE of the auxiliary signal line PL-G may be a portion of the auxiliary signal line PL-G and may be defined as a portion of the auxiliary signal line PL-G, which overlaps with the first sealing member SS1. In certain embodiments, the end portion PL-GE may be defined as the whole or a part of the portion, overlapping with the first sealing member SS1, of the auxiliary signal line PL-G.

A side surface PL-GS of the auxiliary signal line PL-G (e.g., a side surface PL-GS of the end portion PL-GE of the auxiliary signal line PL-G) may be substantially aligned with a side surface BS1-S of the first base substrate BS1. A side surface SS1-S of the first sealing member SS1 may be substantially aligned with the side surface BS1-S of the first base substrate BS1. The side surface BS1-S of the first base substrate BS1 may be substantially aligned with a side surface BS2-S of the second base substrate BS2.

The connection pad CP is disposed on the side surface of the display panel DP. In more detail, the connection pad CP may be coupled to at least the side surface BS1-S of the first base substrate BS1, the side surface SS1-S of the first sealing member SS1 and the side surface BS2-S of the second base substrate BS2. In an embodiment, a length of the connection pad CP in the third direction DR3 may be adjusted such that the connection pad CP may not be in contact with the side surface BS2-S of the second base substrate BS2.

The connection pad CP is connected to the end portion PL-GE of the auxiliary signal line PL-G. The connection pad CP may be provided in plurality, and the connection pads CP may be connected to the side surfaces PL-GS of the end portions PL-GE in one-to-one correspondence. The connection pad CP may be electrically connected to a pad GCB-P of the circuit board GCB through an anisotropic conductive film (ACF). The anisotropic conductive film (ACF) may be replaced with solder paste, and the connection pad CP may be connected directly to the pad GCB-P of the circuit board GCB.

Since the connection pad CP is disposed on the side surface of the display panel DP, the circuit board GCB may be connected to the side surface of the display panel DP. In other words, a connection area of the circuit board GCB and the display panel DP may be defined on the side surface of the display panel DP, and thus an area of the non-display area NDA may be reduced.

FIGS. 6D and 6E illustrate one non-pad area NPDA of FIG. 6A in detail. A signal line (e.g., the auxiliary signal line PL-G) is not disposed in the non-pad area PDA, as compared with the pad area PDA. The signal line does not overlap with a portion of the first sealing member SS1, which is disposed in the non-pad area NPDA.

An end portion of the common electrode CE may overlap with the first sealing member SS1. The side surface SS1-S of the first sealing member SS1 may be substantially aligned with the side surface BS1-S of the first base substrate BS1 and the side surface BS2-S of the second base substrate BS2 in each of the non-pad area NPDA and the pad area PDA. Thus, the first sealing member SS1 may firmly support an edge area of the display panel DP in a plan view.

The first sealing member SS1 may be a non-conductive sealing member, and the second sealing member SS2 may be a conductive sealing member. As illustrated in FIG. 6F, the first sealing member SS1 may include a first synthetic resin PM1 and first inorganic fillers IP1 mixed with the first synthetic resin PM1. The first inorganic fillers IP1 may improve a hardness of the first sealing member SS1.

The first synthetic resin PM1 may include an acrylic epoxy-based resin. The first inorganic fillers IP1 may include a silica-based inorganic material. In an embodiment, the first inorganic fillers IP1 may include two different kinds of inorganic fillers. The first synthetic resin PM1 may further include other additive(s). The additives may include an amine-based hardener and a photo initiator. The additives may further include a silane-based additive and an acrylic-based additive.

As illustrated in FIG. 6G, the second sealing member SS2 may include a second synthetic resin PM2, second inorganic fillers IP2 mixed with the second synthetic resin PM2, and conductive particles CPS mixed with the second synthetic resin PM2. The conductive particles CPS electrically connect the voltage supply line DVL to the common electrode CE. In the embodiment of FIG. 6G, the voltage supply line DVL may be disposed on the first insulating layer 10 and may be formed by the same process as the input electrode SE (see FIG. 5A). Alternatively, the voltage supply line DVL may be disposed on a layer different from the first insulating layer 10.

The second synthetic resin PM2 may include the same material as the first synthetic resin PM1, and the second inorganic fillers IP2 may include the same material as the first inorganic fillers IP1. The conductive particles CPS may include gold particles and/or nickel particles. Diameters (e.g., an average diameter) of the conductive particles CPS may be less than diameters (e.g., an average diameter) of the first inorganic fillers IP1 and diameters (e.g., an average diameter) of the second inorganic fillers IP2.

A weight % of the second inorganic fillers IP2 with respect to the second sealing member SS2 may be less than a weight % of the first inorganic fillers IP1 with respect to the first sealing member SS1. A first mixture and a synthetic resin for the first sealing member SS1 may be mixed with a second mixture including metal particles to form a mixture for the second sealing member SS2. In an embodiment, the second inorganic fillers IP2 of the second sealing member SS2 may be omitted.

Figure 7A:
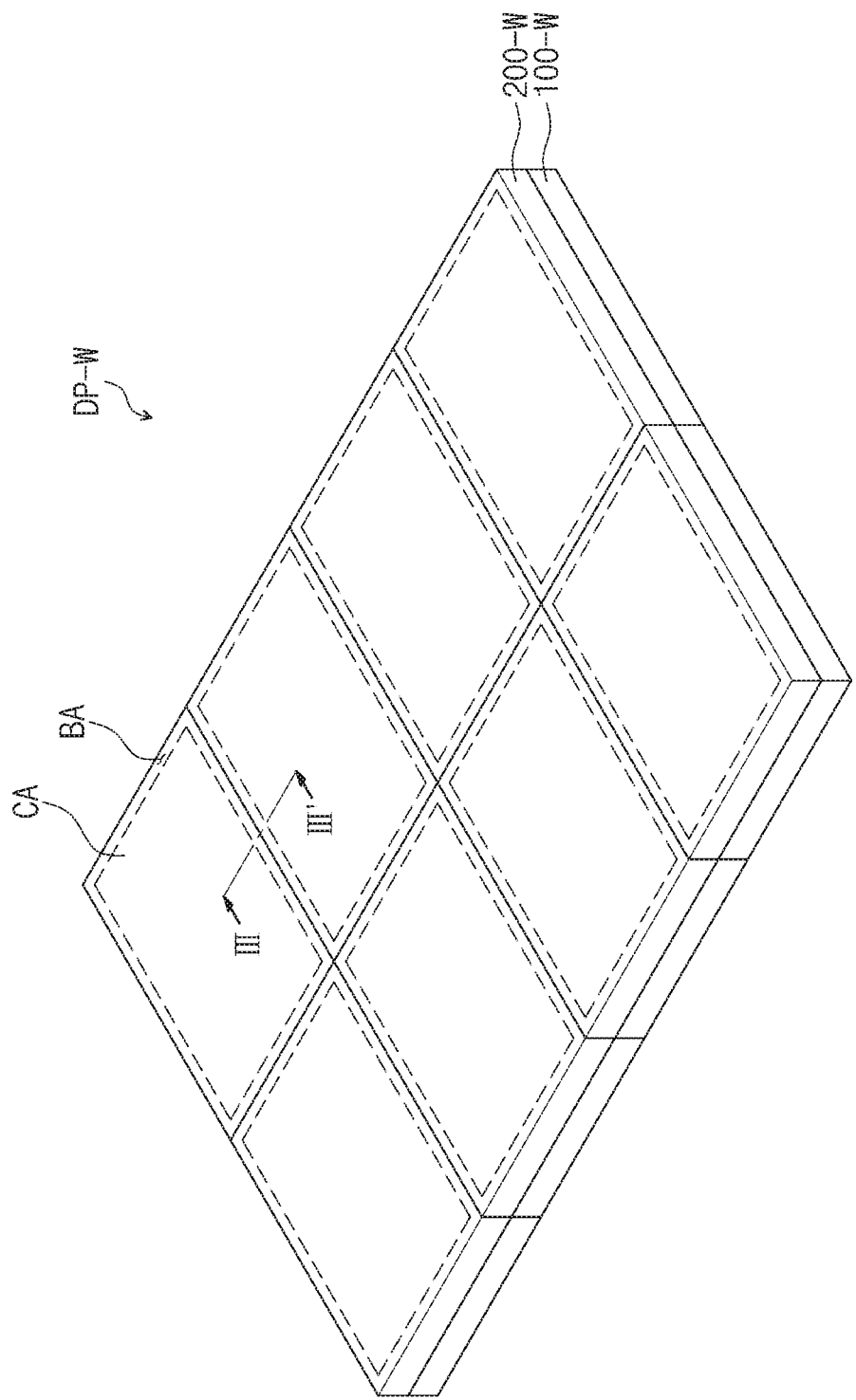
FIG. 7A is a perspective view illustrating a work display panel according to an embodiment of the invention.
Figure 7C:
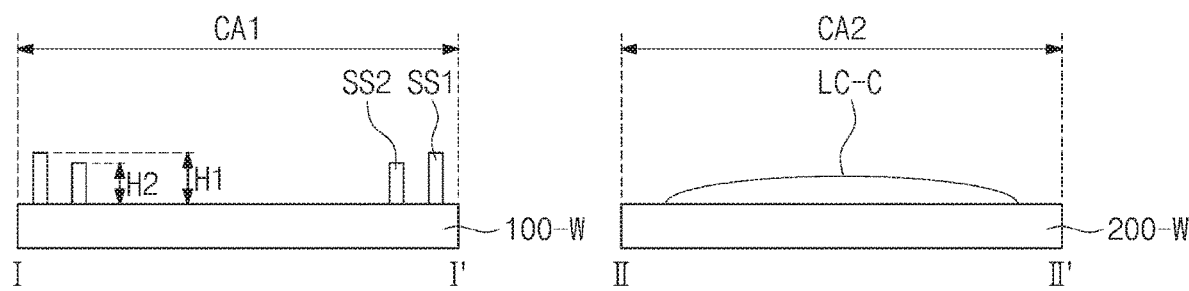
FIG. 7C is a cross-sectional view illustrating cell areas of first and second work display substrates according to an embodiment of the invention.
Figure 7E:
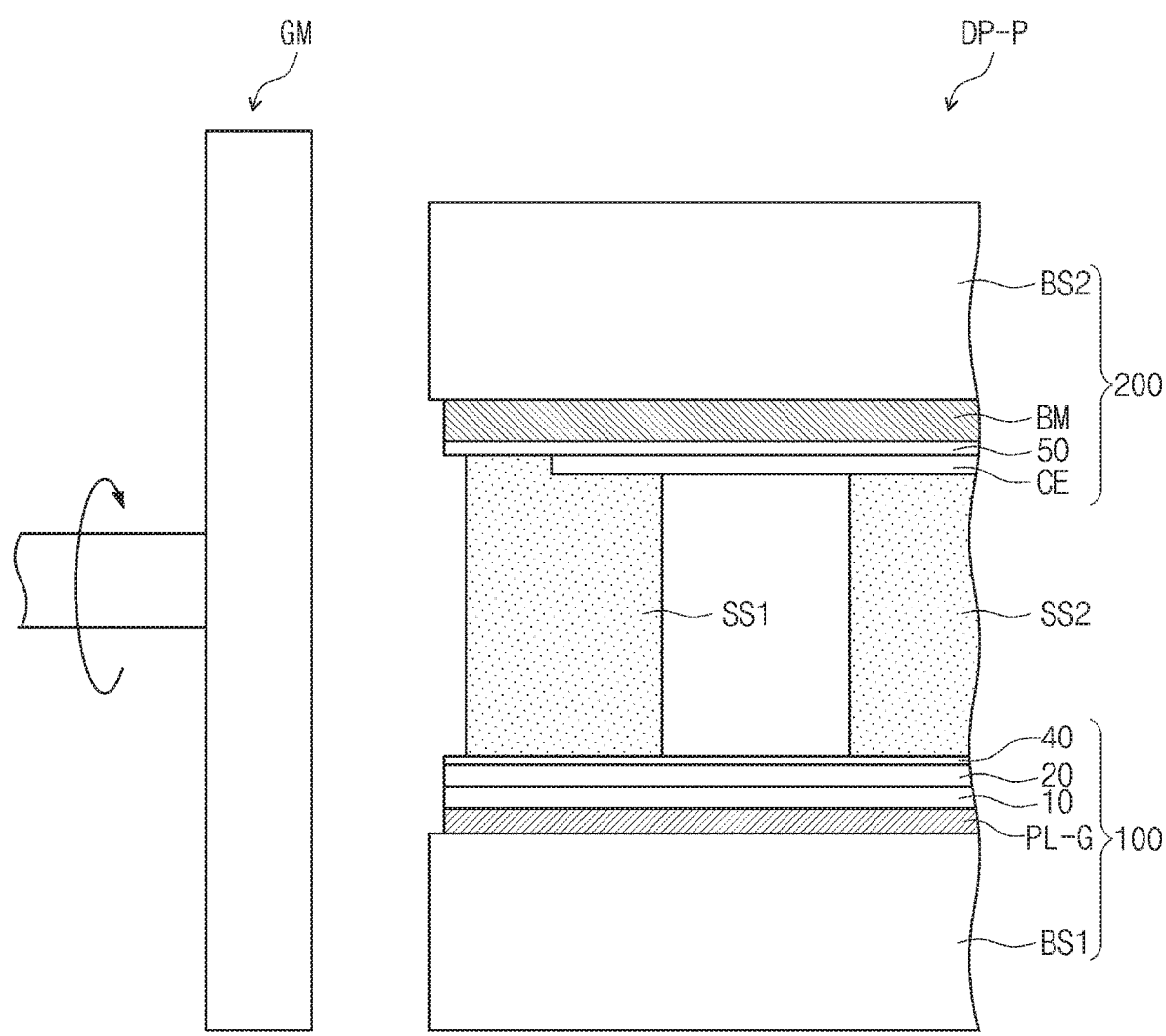
FIGS. 7E and 7F are cross-sectional views illustrating a preliminary display panel according to an embodiment of the invention.
Figure 7F:
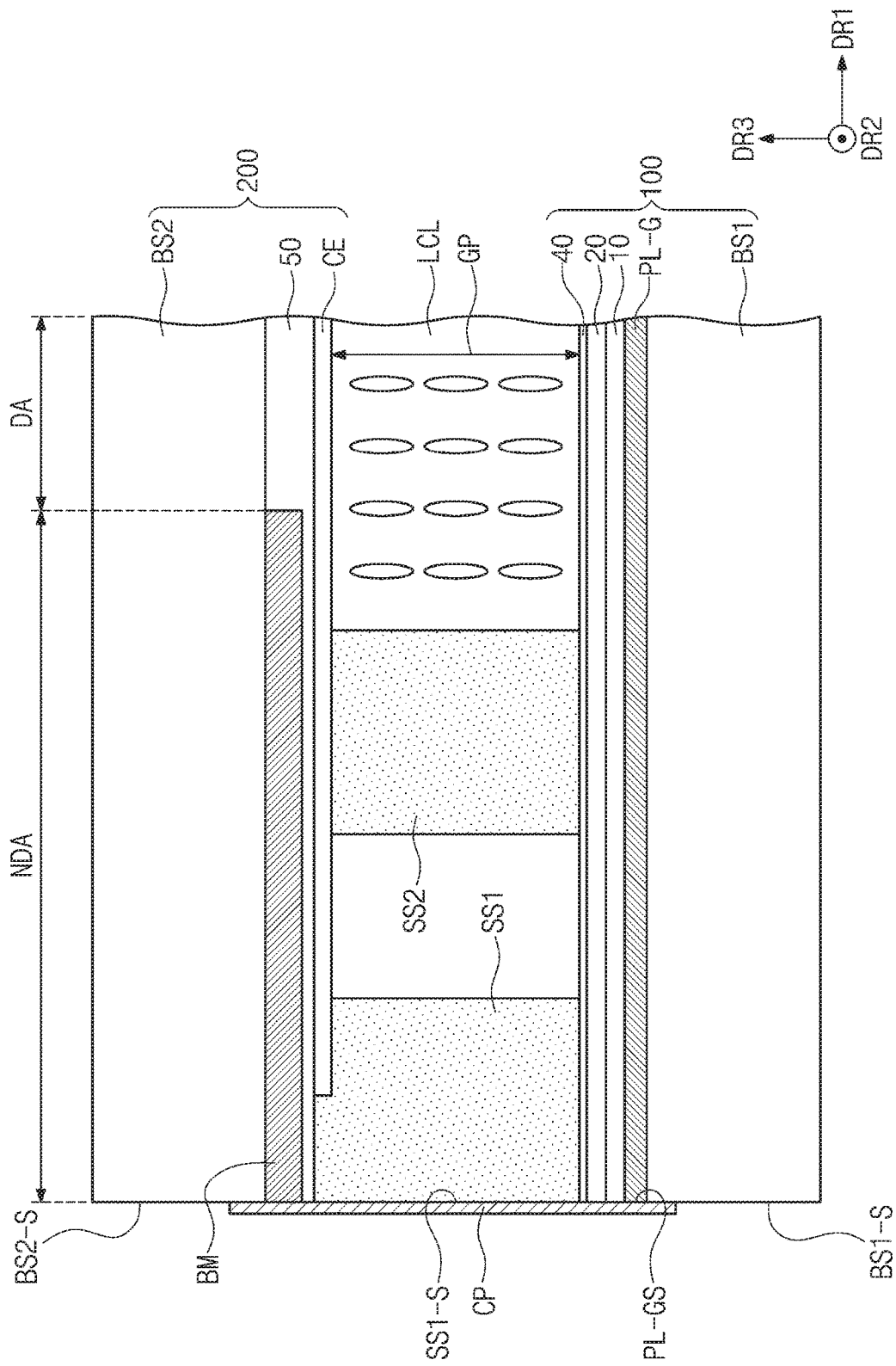

FIG. 7A is a perspective view illustrating a work display panel DP-W according to an embodiment of the invention. FIG. 7B is a perspective view illustrating a first work display substrate 100-W and a second work display substrate 200-W according to an embodiment of the invention. FIG. 7C is a cross-sectional view illustrating cell areas CA1 and CA2 of first and second work display substrates 100-W and 200-W according to an embodiment of the invention. FIG. 7D is a cross-sectional view illustrating a work display panel DP-W according to an embodiment of the invention. FIGS. 7E and 7F are cross-sectional views illustrating a preliminary display panel DP-P according to an embodiment of the invention.

As illustrated in FIG. 7A, the same process may be performed on a plurality of cell areas CA defined in the work display panel DP-W to form the display panel DP (see FIGS. 1 to 6G) in each of the cell areas CA. The cell areas CA are divided by a boundary area BA. The first work display substrate 100-W and the second work display substrate 200-W are coupled to each other to form the work display panel DP-W. As illustrated in FIG. 7B, the first work display substrate 100-W may include first cell areas CA1 corresponding to the cell areas CA and a first boundary area BA1 corresponding to the boundary area BA. The second work display substrate 200-W may include second cell areas CA2 corresponding to the cell areas CA and a second boundary area BA2 corresponding to the boundary area BA.

The first cell area CA1 may correspond to the first display substrate 100 described with reference to FIGS. 1 to 6G, and the second cell area CA2 may correspond to the second display substrate 200 described with reference to FIGS. 1 to 6G.

A first sealing member SS1 and a second sealing member SS2 are formed in one of the first cell area CA1 and the second cell area CA2, and a liquid crystal composition LC-C is provided in the other of the first cell area CA1 and the second cell area CA2. At this time, the first sealing member SS1 and the second sealing member SS2 are in an unhardened state.

As illustrated in FIGS. 7B and 7C, the first sealing member SS1 and the second sealing member SS2 may be formed on the first cell area CA1 of the first work display substrate 100-W. At this time, a height H1 of the first sealing member SS1 may be equal to or greater than a height H2 of the second sealing member SS2. Thus, a pressure applied to the first sealing member SS1 may be greater than a pressure applied to the second sealing member SS2 when the first work display substrate 100-W is coupled to the second work display substrate 200-W. The height H1 of the first sealing member SS1 may be 5% to 20% (in particular, 10% to 20%) greater than the height H2 of the second sealing member SS2.

After the first work display substrate 100-W is coupled to the second work display substrate 200-W, the work display panel DP-W may be cut to form preliminary display panels DP-P (see FIG. 7E). As illustrated in FIG. 7D, a structure extending from structures of the cell areas CA may be disposed in the boundary area BA of the work display panel DP-W. The work display panel DP-W may be cut along a cutting line CL illustrated in FIG. 7D by, for example, a scribing process to separate the preliminary display panels DP-P respectively formed in the cell areas CA. Since the first sealing members SS1 of the cell areas CA do not overlap with the cutting line CL, the first sealing members SS1 are not damaged by the cutting process.

A side surface of the preliminary display panel DP-P of FIG. 7E is in a non-uniform state, as compared with the side surface of the display panel DP of FIG. 6C. The side surface of the preliminary display panel DP-P is ground using a grinder GM (a grinding process). A side surface of the first display substrate 100, a side surface of the second display substrate 200 and a side surface of the first sealing member SS1 may be substantially aligned with each other by the grinding process, as illustrated in FIG. 7F.

A cross-sectional shape of the auxiliary signal line PL-G may be changed depending on a grinding method (e.g., a rotational direction of the grinder GM). However, the side surface of the auxiliary signal line PL-G and the side surface of the first base substrate BS1 may be substantially aligned with each other regardless of the grinding method. In the present specification, the term "substantial alignment" may include a case in which the side surfaces of the first sealing member SS1, the auxiliary signal line PL-G and the first and second base substrates BS1 and BS2 constitute one surface. In addition, the term "substantial alignment" may also include variations as a result of manufacturing techniques and/or process tolerances. For example, the side surface of the auxiliary signal line PL-G may have a fine curved surface formed by the grinder GM. A corner defining the curved side surface of the auxiliary signal line PL-G may be aligned with a corner defining a side surface of an insulating structure.

The first sealing member SS1 maintains tension between the first display substrate 100 and the second display substrate 200 to prevent the insulating layers 10, 20, 40 and 50 of the first and second display substrates 100 and 200 and/or the auxiliary signal line PL-G from being damaged in the grinding process. The first sealing member SS1 supports the first display substrate 100 and the second display substrate 200 to prevent the side surface of the display panel DP from being damaged or deformed by friction of the grinder GM.

Even though not shown in the drawings, connection pads CP may be formed on the side surface of the display panel DP after the grinding process. Metal paste may be printed on the side surface of the display panel DP, and then, a laser patterning process may be performed on the metal paste to form the connection pads CP corresponding to the auxiliary signal lines PL-G, respectively. After the formation of the connection pads CP, a process of connecting the circuit boards GCB and DCB to the connection pads CP may be performed.

FIGS. 8 to 15 are cross-sectional views illustrating pad areas PDA according to some embodiments of the invention. FIGS. 8 to 15 illustrate cross-sectional views corresponding to FIG. 6C. Hereinafter, the detailed descriptions to the same components as in the embodiments of FIGS. 1 to 7E will be omitted for the purpose of ease and convenience in description.

As illustrated in FIG. 8, the display panel DP may further include an auxiliary electrode SBE. The auxiliary electrode SBE overlaps with the auxiliary signal line PL-G and the first sealing member SS1. The auxiliary electrode SBE may be disposed on the first insulating layer 10 and may be formed through the same process as the input electrode SE of FIG. 5A. A plurality of the auxiliary electrodes SBE may correspond to the auxiliary signal lines PL-G in one-to-one correspondence or one auxiliary electrode SBE may overlap with a plurality of the auxiliary signal lines PL-G.

A side surface of the auxiliary electrode SBE may be aligned with the side surface of the first base substrate BS1. The connection pad CP may be in contact with the side surface of the auxiliary electrode SBE. The auxiliary electrode SBE may be disposed on the auxiliary signal line PL-G to withstand stress applied to the auxiliary signal line PL-G in the grinding process, and thus damage/deformation of the auxiliary signal line PL-G may be prevented.

Figure 9:
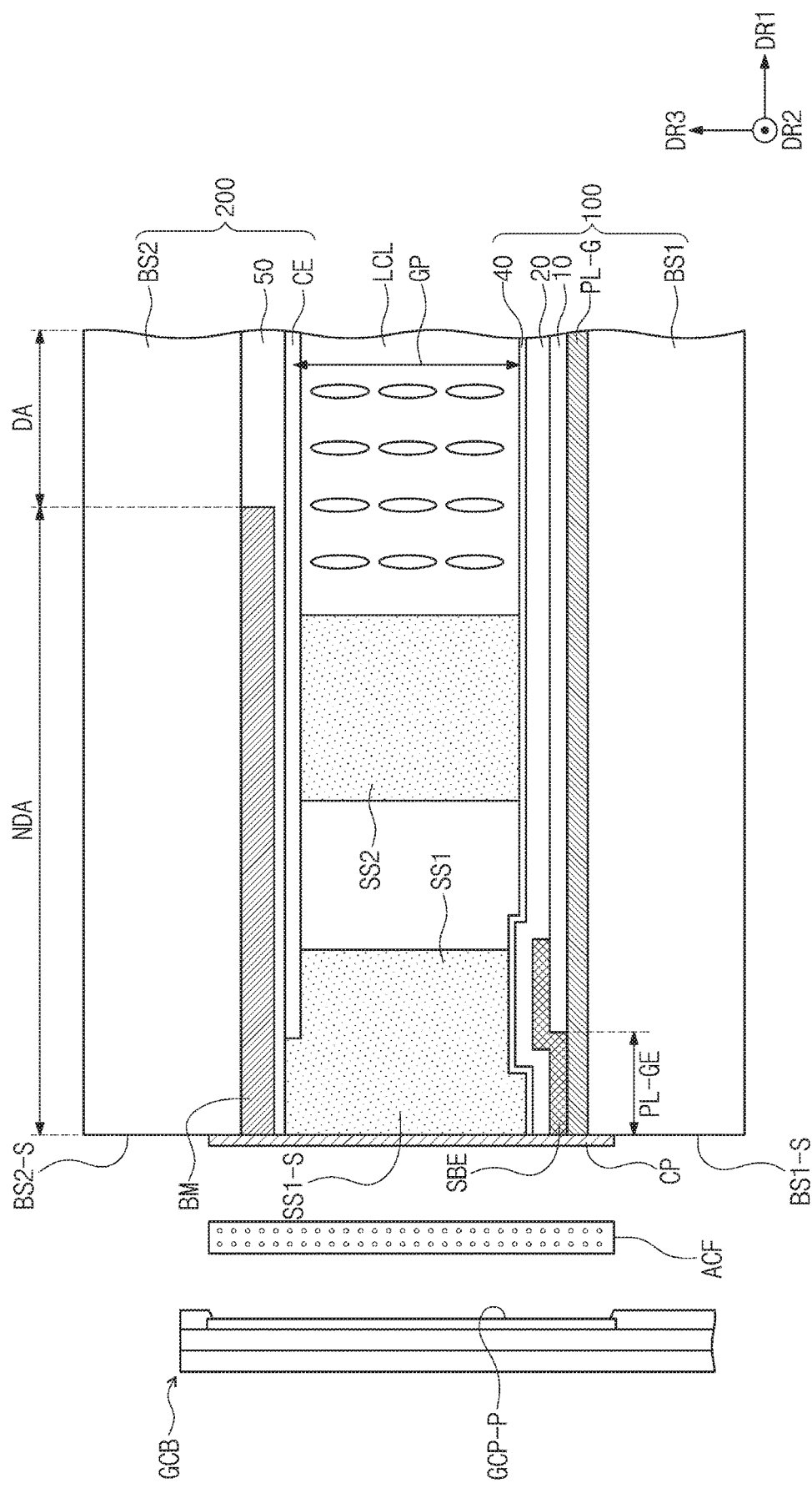

As illustrated in FIG. 9, the auxiliary electrode SBE may be connected to the end portion PL-GE of the auxiliary signal line PL-G. A portion of the first insulating layer 10 may be removed. Removed areas of the first insulating layer 10 may correspond to the auxiliary signal lines PL-G in one-to-one correspondence or one removed area may overlap with a plurality of the auxiliary signal lines PL-G. An electrical connection area between the connection pad CP and the auxiliary signal line PL-G may be increased by the auxiliary electrode SBE, and thus a contact resistance between the connection pad CP and the auxiliary signal line PL-G may be reduced.

Figure 10:
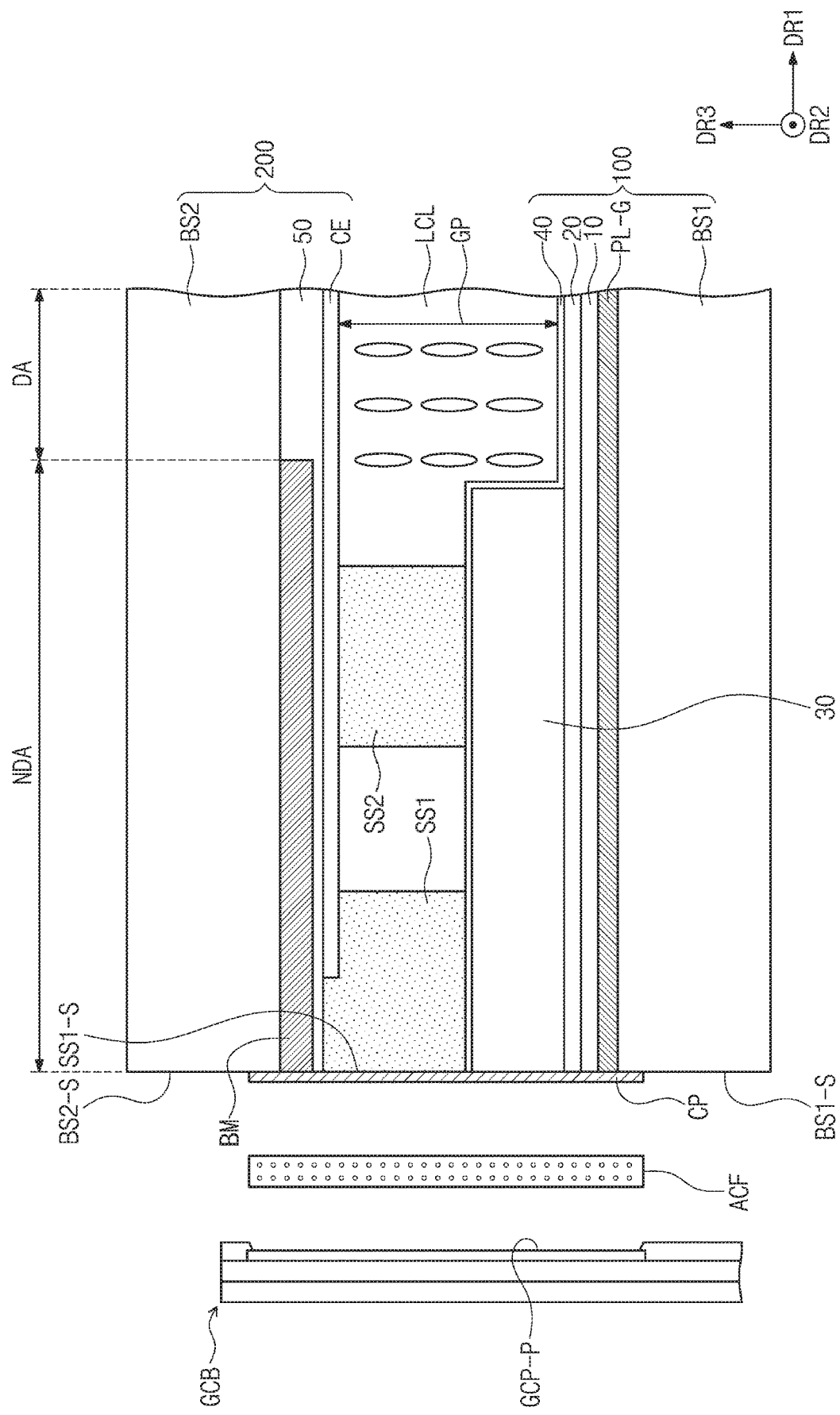

As illustrated in FIG. 10, the display panel DP may further include a third insulating layer 30 overlapping with the non-display area NDA. In the present embodiment, the third insulating layer 30 may be a color filter 30. A color of the color filter 30 may be a red color, a green color, or a blue color. The color filter 30 may be formed by the same process as the color filter (e.g., the third insulating layer 30) of the pixel area PXA (see FIG. 5A). The color filter 30 may have a line shape overlapping with the pad areas PDA (see FIG. 6A) and the non-pad areas NPDA (see FIG. 6A) when viewed in a plan view. Since the color filter 30 is disposed, heights of the first and second sealing members SS1 and SS2 may be reduced.

In another embodiment, the color filter 30 may overlap with only one of the first and second sealing members SS1 and SS2. Thus, the height of the one of the first and second sealing members SS1 and SS2 may be reduced.

Figure 11:
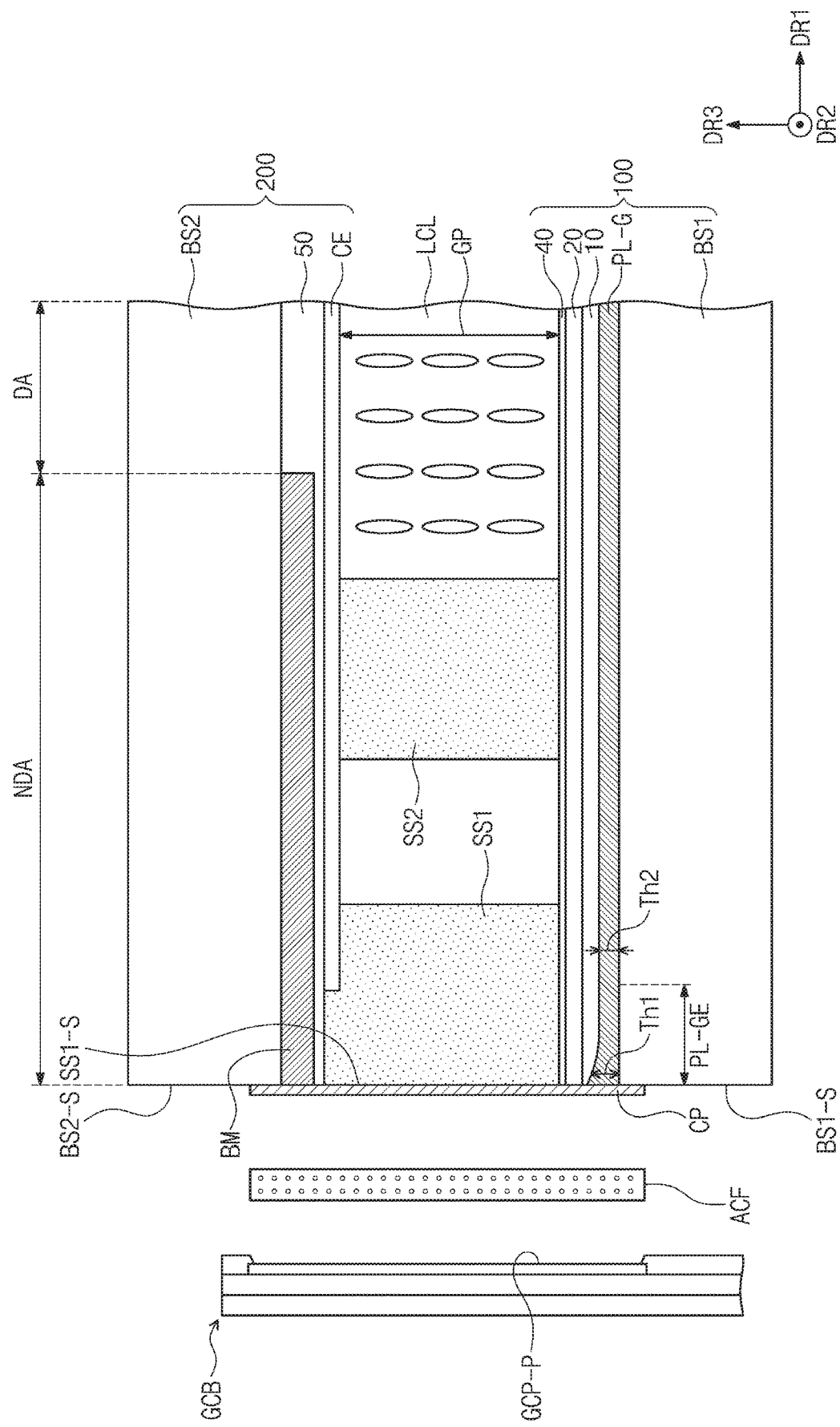

As illustrated in FIG. 11, a thickness Th1 of the end portion PL-GE of the auxiliary signal line PL-G may be greater than a thickness Th2 of an inner portion, not overlapping with the first sealing member SS1, of the auxiliary signal line PL-G. This is because the end portion PL-GE is deformed by the friction of the grinder GM in the grinding process illustrated in FIG. 7E.

Figure 12:
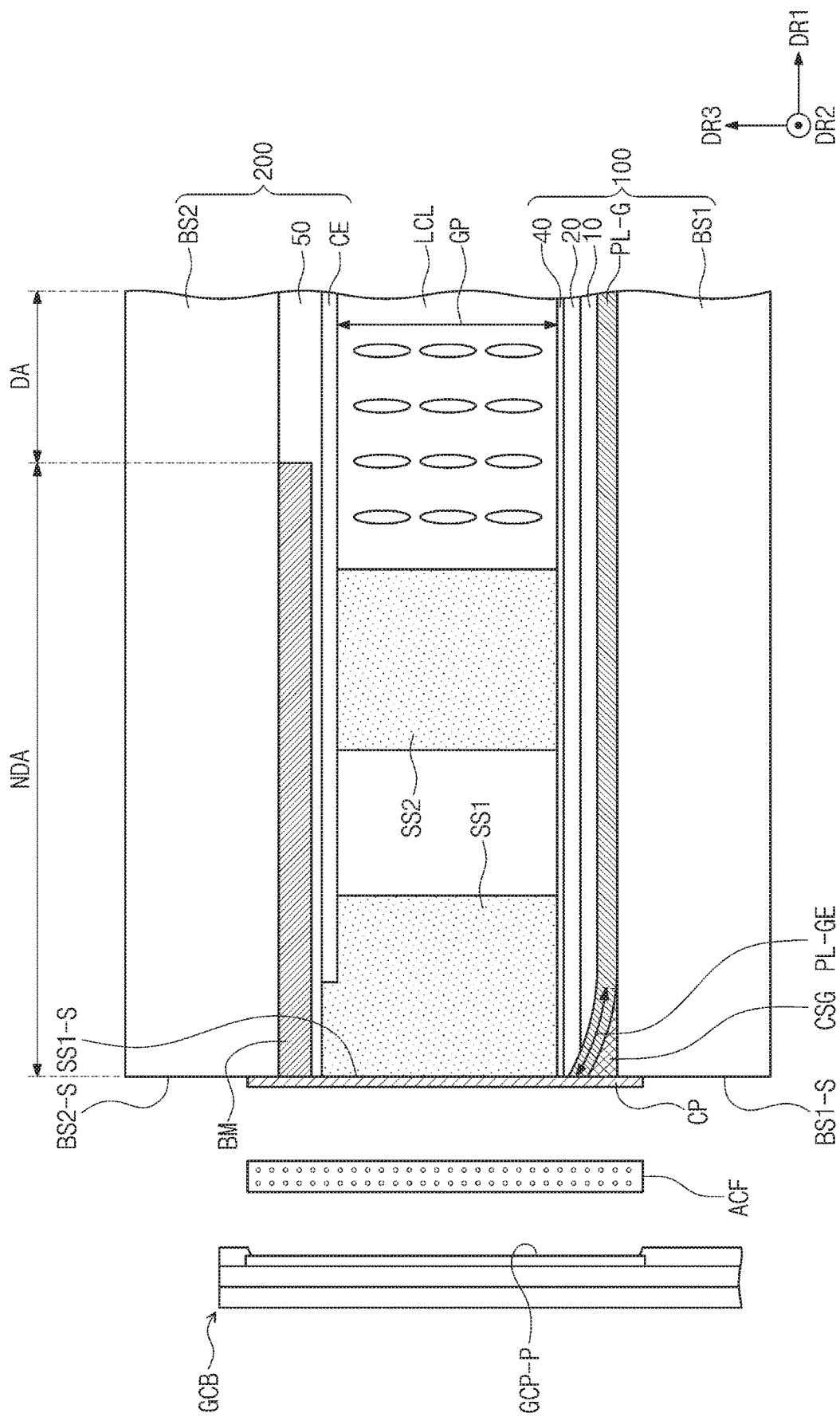
Figure 13:
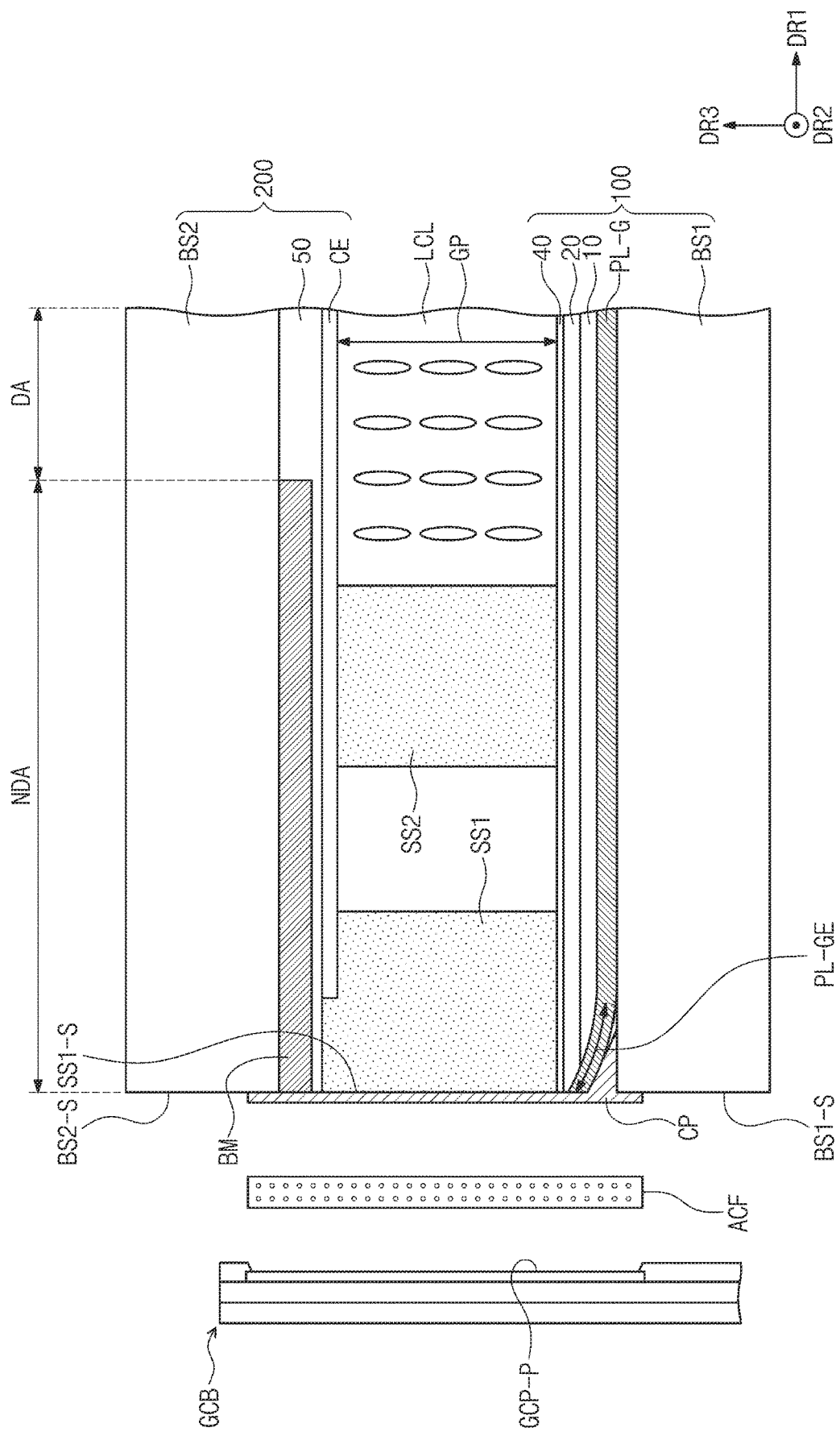

As illustrated in FIGS. 12 and 13, the end portion PL-GE of the auxiliary signal line PL-G may be partially spaced apart from a top surface of the first base substrate BS1. This is because stress is applied to the end portion PL-GE of the auxiliary signal line PL-G by the grinder GM in the grinding process illustrated in FIG. 7E.

As illustrated in FIG. 12, conductive sludge CSG may be disposed between the end portion PL-GE of the auxiliary signal line PL-G and a portion of the top surface of the first base substrate BS1, from which the end portion PL-GE of the auxiliary signal line PL-G is spaced apart. The conductive sludge CSG may include a ground material of the auxiliary signal line PL-G and a ground material of the first base substrate BS1. The conductive sludge CSG may further include a ground material of the first insulating layer 10.

As illustrated in FIG. 13, a portion of the connection pad CP may be disposed between the end portion PL-GE of the auxiliary signal line PL-G and the portion of the top surface of the first base substrate BS1, from which the end portion PL-GE of the auxiliary signal line PL-G is spaced apart. The conductive paste may be inserted into a space between the end portion PL-GE and the first base substrate BS1 in the process of printing the conductive paste.

Figure 14:
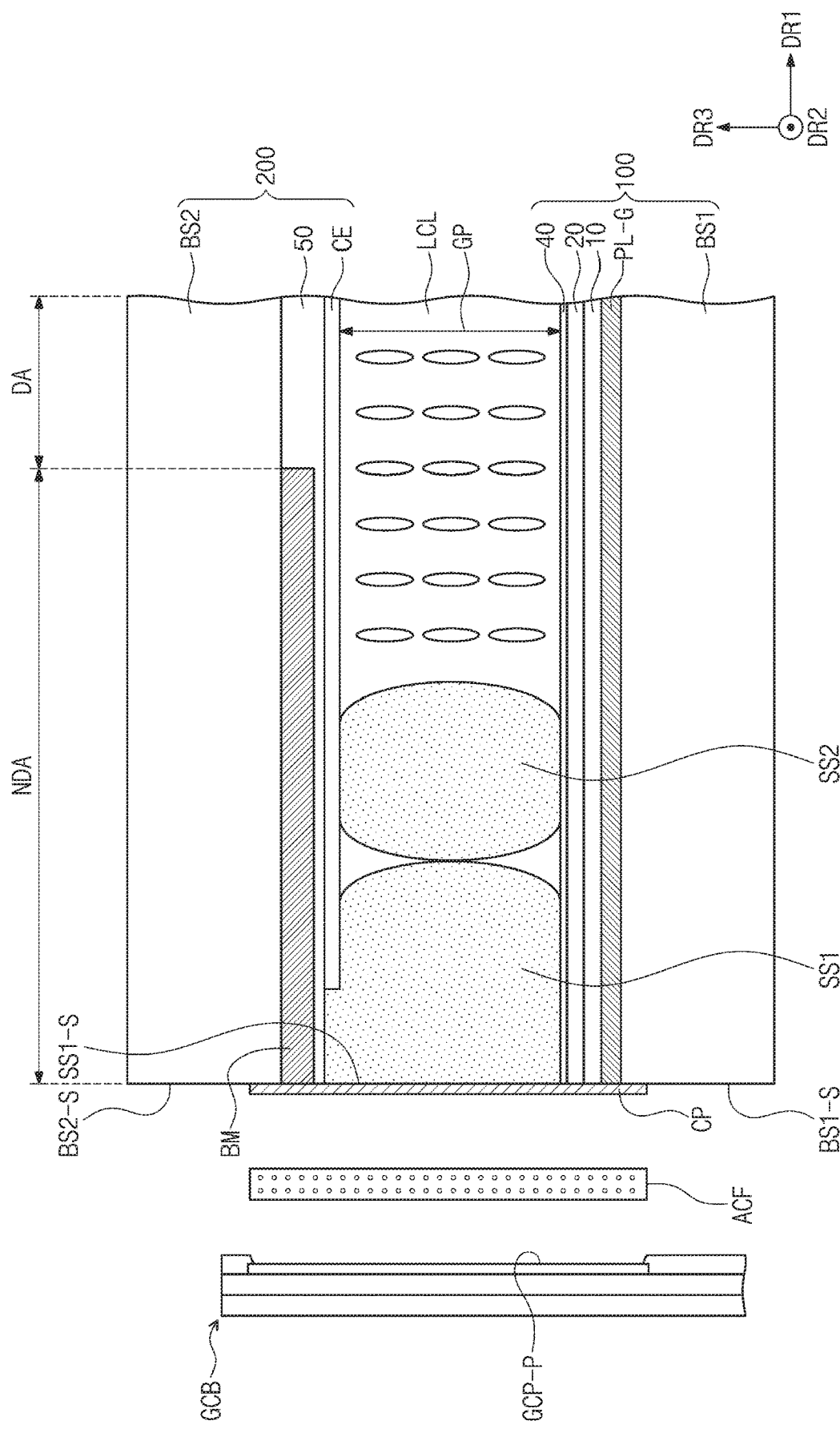

As illustrated in FIG. 14, the first sealing member SS1 and the second sealing member SS2 may be in contact with each other. When a distance between the first and second sealing members SS1 and SS2 is designed to be narrow in the process of forming the first and second sealing members SS1 and SS2 in FIG. 7C, shapes of the first and second sealing members SS1 and SS2 may be deformed in the process of coupling the first work display substrate 100-W to the second work display substrate 200-W. Thus, the first and second sealing members SS1 and SS2 may be in contact with each other.

Figure 15:
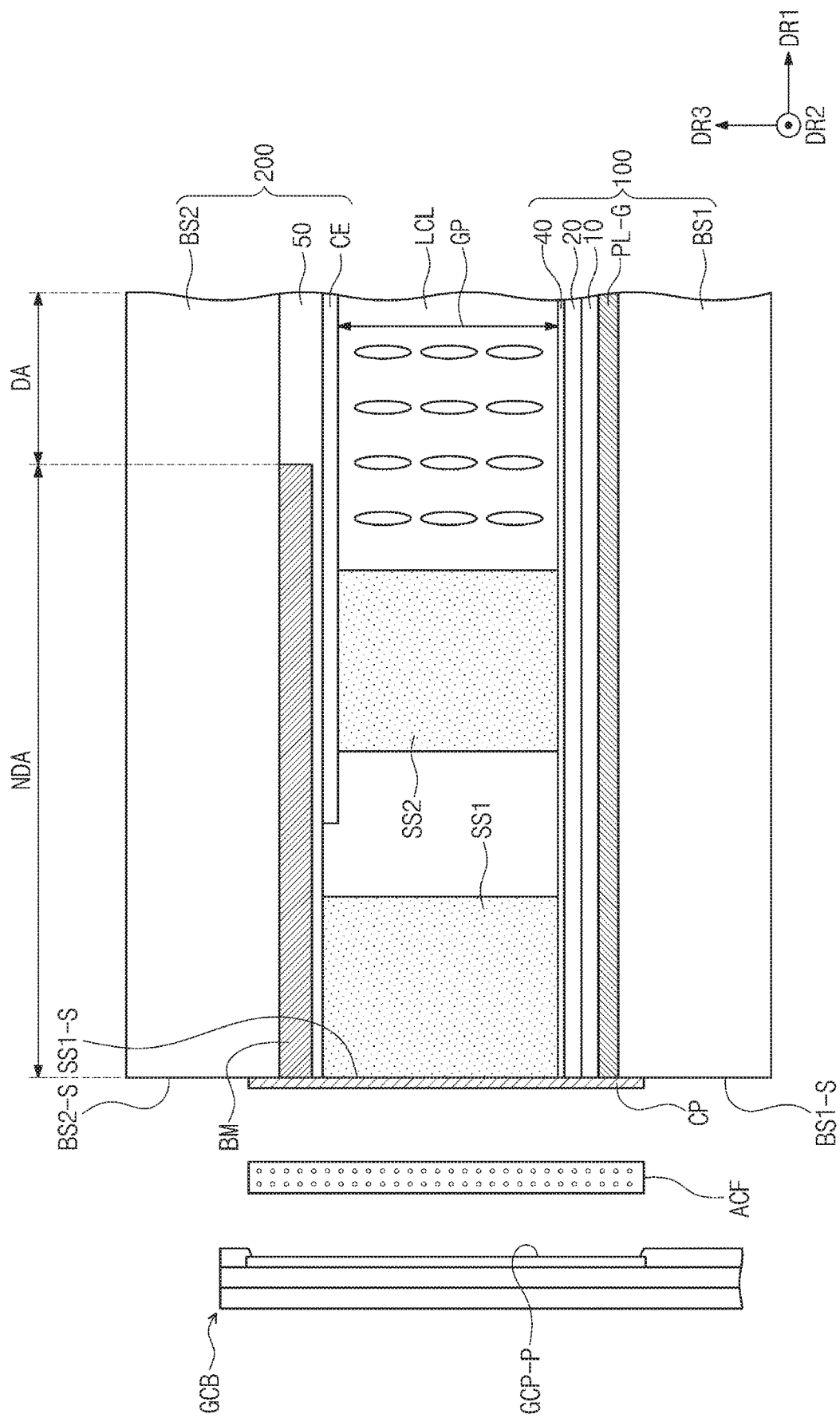

As illustrated in FIG. 15, the common electrode CE may not be disposed between the first sealing member SS1 and an insulating layer (e.g., the fifth insulating layer 50) of the second display substrate 200. An edge of the common electrode CE may be disposed inside the first sealing member SS1 in a plan view and may not overlap with the first sealing member SS1.

Figure 16A:
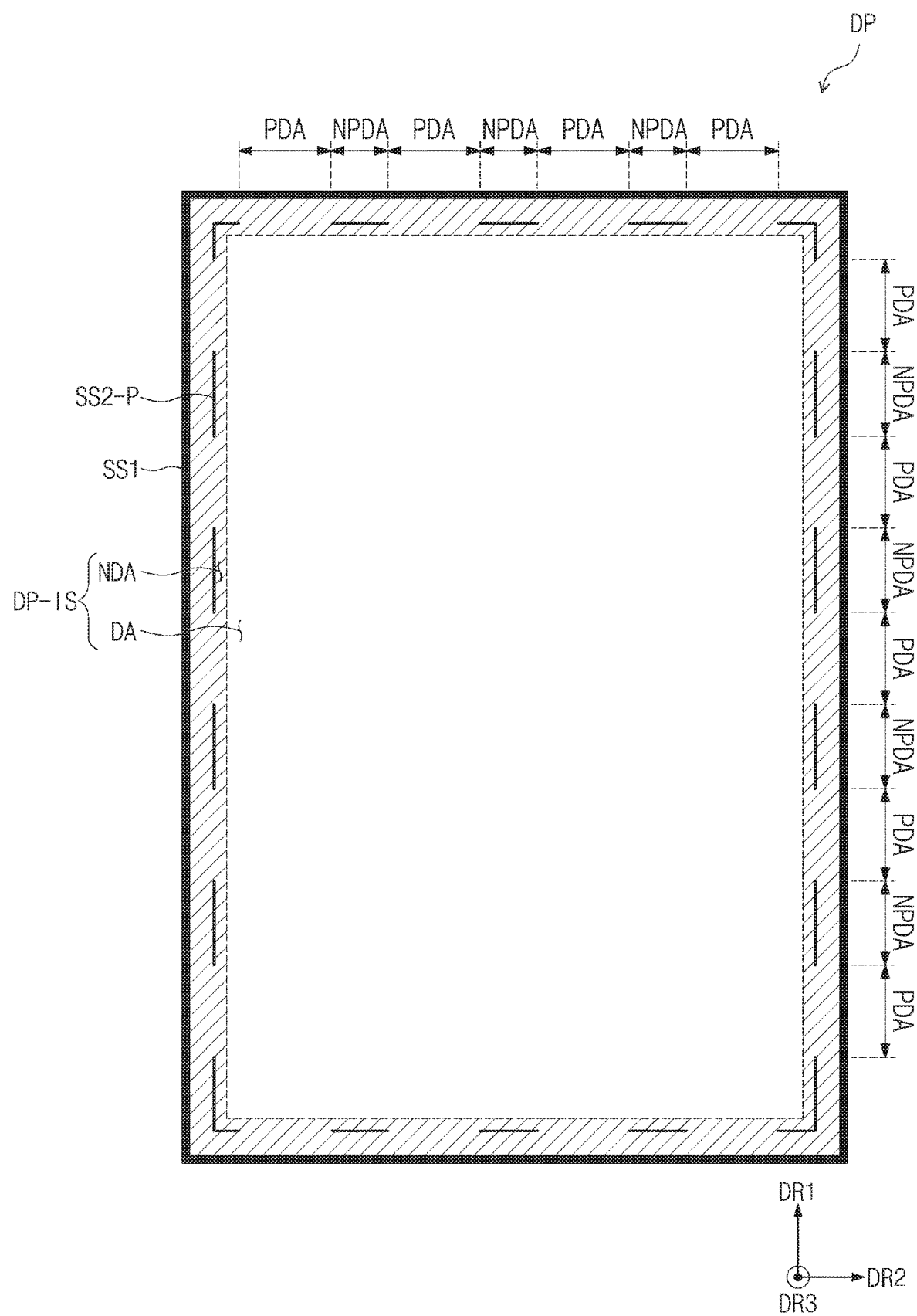
FIGS. 16A and 16B are plan views illustrating display panels according to some embodiments of the invention.
Figure 16B:
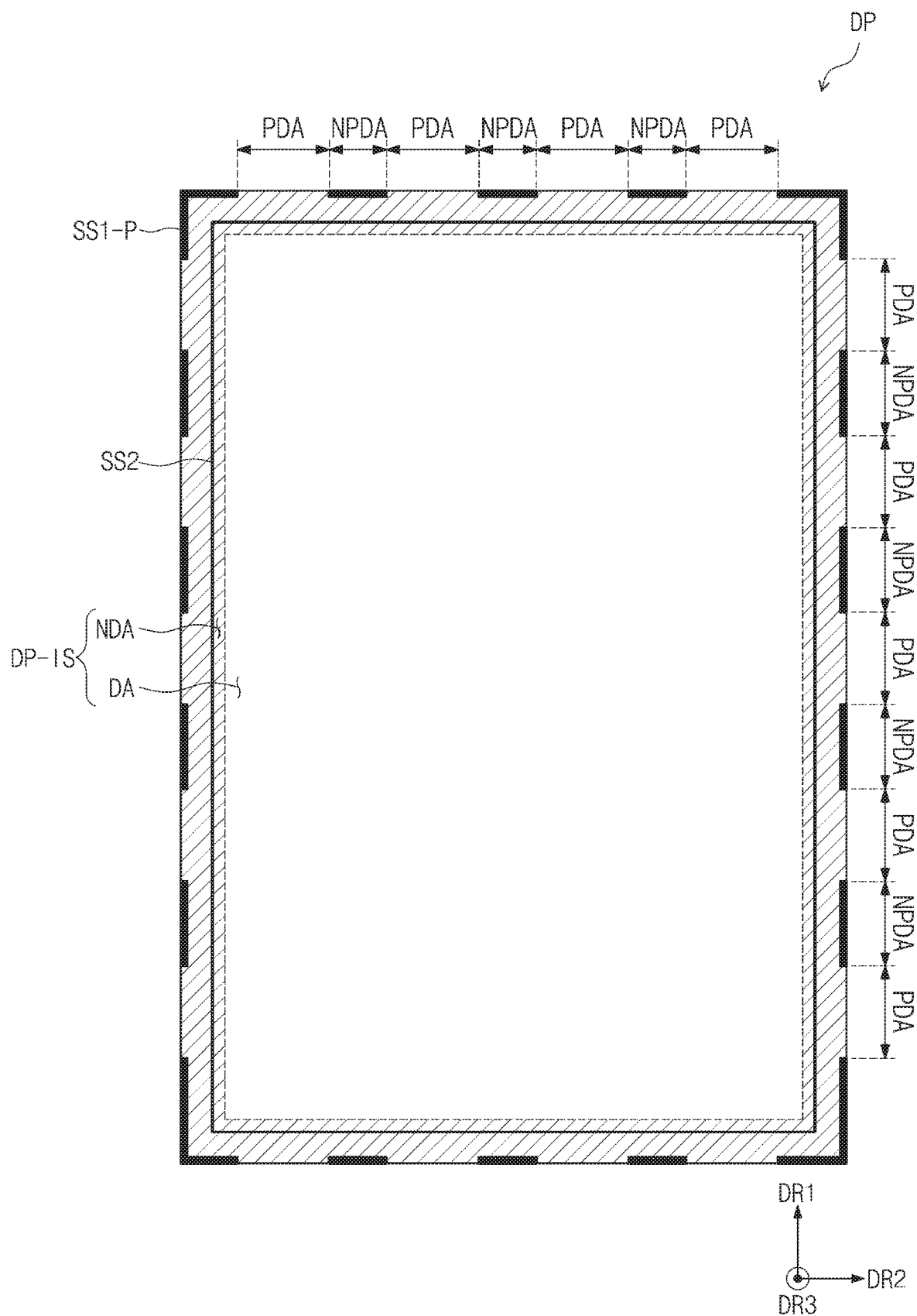

FIGS. 16A and 16B are plan views illustrating display panels DP according to some embodiments of the invention. FIGS. 16A and 16B illustrate plan views corresponding to FIG. 6A.

As illustrated in FIG. 16A, a second sealing member may include a plurality of portions SS2-P spaced apart from each other. At least one of the portions SS2-P may have the same cross-sectional shape as illustrated in FIG. 6G. That is, the second sealing member does not have to form a closed loop but can be formed by portions SS2-P to form a loop around a perimeter of the display panel inside the outer perimeter of the display panel. Meanwhile, the first sealing member SS1 may form a closed perimeter around the display panel.

As illustrated in FIG. 16B, a first sealing member may include a plurality of portions SS1-P spaced apart from each other. The portions SS1-P may overlap with at least the non-pad areas NPDA. That is, the first sealing member does not have to form a closed loop but can be formed by portions SS1-P to form a loop around the outer perimeter of the display panel. Meanwhile, the second sealing member SS2 may form a closed perimeter around the display panel.

According to the above descriptions, the connection pad may be disposed on the side surface of the display panel, and thus the circuit board may be connected to the side surface of the display panel. Since a connection area of the circuit board and the display panel is defined on the side surface of the display panel, an area of the non-display area may be reduced.

The non-conductive sealing member may be disposed outside the conductive sealing member in a plan view, and thus an edge area of the first and second display substrates may be firmly supported by the non-conductive sealing member. The non-conductive sealing member may maintain tension between the first and second display substrates to prevent the insulating layers of the first and second display substrates and/or the signal line from being damaged in a fabrication process (e.g., the grinding process). A contact area defined on the side surface of the signal line may be secured to reduce a contact resistance between the circuit board and the display panel.

While the invention has been described with reference to example embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A display panel comprising:
    a first display substrate;
    a second display substrate facing and spaced apart from the first display substrate;
    a non-conductive sealing member disposed between the first display substrate and the second display substrate;
    a conductive sealing member disposed between the first display substrate and the second display substrate and disposed inside the non-conductive sealing member when viewed in a plan view; and
    a connection pad coupled to a side surface of the first display substrate and a side surface of the non-conductive sealing member,
    wherein the first display substrate comprises:
        is a first base substrate;
        a thin film transistor disposed on the first base substrate;
        at least one insulating layer disposed on the first base substrate;
        a pixel electrode disposed on the first base substrate and connected to the thin film transistor;
        a signal line disposed on the first base substrate and including an end portion overlapping with the non-conductive sealing member and connected to the connection pad; and
        a voltage supply line disposed on the first base substrate and connected to the conductive sealing member.

2. The display panel of claim 1, wherein the non-conductive sealing member comprises:
    a first synthetic resin; and
    first inorganic fillers mixed with the first synthetic resin.

3. The display panel of claim 2, wherein the conductive sealing member comprises:
    a second synthetic resin; and
    conductive particles mixed with the second synthetic resin.

4. The display panel of claim 3, wherein the conductive sealing member further comprises second inorganic fillers mixed with the second synthetic resin.

5. The display panel of claim 3, wherein a diameter of the conductive particles is less than a diameter of the first inorganic fillers.

6. The display panel of claim 1, wherein the side surface of the non-conductive sealing member is substantially aligned with a side surface of the first base substrate.

7. The display panel of claim 1, wherein a side surface of the end portion of the signal line is substantially aligned with a side surface of the first base substrate.

8. The display panel of claim 1, wherein the second display substrate comprises a second base substrate and a common electrode disposed on one surface of the second base substrate, and
    wherein the non-conductive sealing member and the conductive sealing member are connected to the common electrode.

9. The display panel of claim 1, wherein the thin film transistor comprises a control electrode, an active part, and an input electrode and an output electrode disposed on a layer different from a layer on which the control electrode is disposed, and
    wherein the voltage supply line is disposed on the same layer as the control electrode or the input electrode.

10. The display panel of claim 9, further comprising:
    an auxiliary electrode overlapping with the end portion of the signal line, and
    wherein the signal line is disposed on the same layer as the control electrode.

11. The display panel of claim 10, wherein the auxiliary electrode is disposed on the same layer as the input electrode.

12. The display panel of claim 10, wherein the auxiliary electrode is connected to the end portion of the signal line.

13. The display panel of claim 1, wherein the insulating layer comprises a plurality of color filters, and
    wherein one of the plurality of color filters overlaps with the pixel electrode.

14. The display panel of claim 13, wherein the insulating layer further comprises a first inorganic layer disposed under the plurality of color filters and a second inorganic layer disposed on the plurality of color filters.

15. The display panel of claim 13, wherein another one of the plurality of color filters overlaps with at least one of the non-conductive sealing member or the conductive sealing member.

16. The display panel of claim 1, wherein a thickness of the end portion of the signal line is greater than a thickness of the signal line not overlapping with the non-conductive sealing member.

17. The display panel of claim 1, wherein the end portion of the signal line is spaced apart from a top surface of the first base substrate.

18. The display panel of claim 17, wherein conductive sludge is disposed between the end portion of the signal line and a portion of the top surface of the first base substrate, from which the end portion of the signal line is spaced apart.

19. The display panel of claim 1, wherein at least one of the non-conductive sealing member or the conductive sealing member forms a closed perimeter around the display panel when viewed in a plan view.

20. A display panel comprising:
- a first display substrate;
- a second display substrate facing and spaced apart from the first display substrate;
- a non-conductive sealing member disposed between the first display substrate and the second display substrate; and
- a connection pad coupled to a side surface of the first display substrate and a side surface of the non-conductive sealing member, wherein the first display substrate comprises:
- a first base substrate including a side surface substantially aligned with the side surface of the non-conductive sealing member;
- a signal line disposed on a top surface of the first base substrate, wherein the signal line includes: an end portion overlapping with the non-conductive sealing member and connected to the connection pad; and
- an auxiliary electrode connected to the end portion of the signal line and the connection pad, wherein the second display substrate comprises:
- a second base substrate; and
- a common electrode disposed on a bottom surface of the second base substrate and overlapping with the non-conductive sealing member.

21. A method of fabricating a display panel, the method comprising:
- providing a first work display substrate including: first cell areas; and a first boundary area dividing the first cell areas;
- providing a second work display substrate including: second cell areas corresponding to the first cell areas; and a second boundary area corresponding to the first boundary area;
- forming a first sealing member and a second sealing member in each of the first cell areas, wherein the second sealing member is disposed inside the first sealing member when viewed in a plan view;
- providing a liquid crystal material to each of the second cell areas;
- coupling the first work display substrate and the second work display substrate to form a work display panel;
- cutting the work display panel along the first boundary area to separate a preliminary display panel from the work display panel;
- grinding a side surface of the preliminary display panel; and
- forming a connection pad on the side surface of the preliminary display panel, wherein a height of the first sealing member is greater than a height of the second sealing member.

* * * * *

UNITED STATES PATENT AND TRADEMARK OFFICE
CERTIFICATE OF CORRECTION

PATENT NO. : 10,634,955 B2
APPLICATION NO. : 16/236648
DATED : April 28, 2020
INVENTOR(S) : Saeron Park and Seungki Song Page 1 of 1

It is certified that error appears in the above-identified patent and that said Letters Patent is hereby corrected as shown below:

In the Claims

Column 17, Lines 41-67, should read:
1. A display panel comprising:
    a first display substrate;
    a second display substrate facing and spaced apart from the first display substrate;
    a non-conductive sealing member disposed between the first display substrate and the second display substrate;
    a conductive sealing member disposed between the first display substrate and the second display substrate and disposed inside the non-conductive sealing member when viewed in a plan view; and
    a connection pad coupled to a side surface of the first display substrate and a side surface of the non-conductive sealing member,
wherein the first display substrate comprises:
    a first base substrate;
    a thin film transistor disposed on the first base substrate;
    at least one insulating layer disposed on the first base substrate;
    a pixel electrode disposed on the first base substrate and connected to the thin film transistor;
    a signal line disposed on the first base substrate and including an end portion overlapping with the non-conductive sealing member and connected to the connection pad; and
    a voltage supply line disposed on the first base substrate and connected to the conductive sealing member.

Signed and Sealed this
Thirtieth Day of June, 2020

Andrei Iancu
*Director of the United States Patent and Trademark Office*